US006666534B2

(12) United States Patent
McIntyre et al.

(10) Patent No.: US 6,666,534 B2
(45) Date of Patent: Dec. 23, 2003

(54) METHOD AND APPARATUS FOR MAKING AN ALBUM PAGE

(75) Inventors: Dale F. McIntyre, Honeoye Falls, NY (US); Joseph A. Manico, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/174,170

(22) Filed: Jun. 18, 2002

(65) Prior Publication Data

US 2002/0180837 A1 Dec. 5, 2002

Related U.S. Application Data

(62) Division of application No. 09/452,336, filed on Nov. 30, 1999, now Pat. No. 6,435,562.

(51) Int. Cl.$^{7}$ .................................... H04N 1/034

(52) U.S. Cl. ............................ 347/3; 347/86; 347/101

(58) Field of Search ......................... 347/2, 3, 86, 101, 347/104, 49; 400/124.08, 611–621.2; 399/110, 111

(56) References Cited

U.S. PATENT DOCUMENTS 5,627,016 A 5/1997 Manico
5,784,077 A * 7/1998 Silverbrook .................. 347/2
5,791,692 A 8/1998 Manico et al.
5,801,721 A 9/1998 Gandy et al.

FOREIGN PATENT DOCUMENTS

DE 40 34 327 A1 4/1992

* cited by examiner

*Primary Examiner*—Stephen D. Meier
*Assistant Examiner*—Michael S. Brooke
(74) *Attorney, Agent, or Firm*—Frank Pincelli

(57) ABSTRACT

A method and apparatus for making a photo album page. The apparatus includes a first supply of a media having a front and back side, a first print head located adjacent the front side of the media; a first transport mechanism for advancing the first supply of media in a first processing path; a second supply of a second media having a front and back side, the front side of the second media is such that digital images may be printed thereon; a second print head for providing images on the front side of the second media; a second first transport mechanism for advancing the first media along a first processing path, the first path and second path being positioned such that initially the paths are initially separated and later combined to form a single processing path such that the back sides of first media and second media will be co-extensive with each other; and a securing mechanism for bringing together and securing the first media and second media so as to form a substantially integral web. Alternatively printing is provided on both sides of the media using two different printing mechanisms. A replaceable cartridge may be used in the apparatus for printing having a first print mechanism for printing on a first side of the media and a second print mechanism for printing on a second side of the media.

4 Claims, 20 Drawing Sheets

METHOD AND APPARATUS FOR MAKING AN ALBUM PAGE

CROSS REFERENCE TO RELATED APPLICATIONS

This is a divisional application of U.S. Ser. No. 09/452,336, filed Nov. 30, 1999, now U.S. Pat. No. 6,435,562, entitled "METHOD AND APPARATUS FOR MAKING AN ALBUM PAGE", by Dale F. McIntyre and Joseph A. Manico.

U.S. Ser. No. 10/174,308, filed concurrently herewith, entitled "METHOD AND APPARATUS FOR MAKING AN ALBUM PAGE", by Dale F. McIntyre and Joseph A. Manico.

U.S. Ser. No. 09/450,608, filed Nov. 30, 1999, entitled "METHOD AND APPARATUS FOR MAKING AN ALBUM PAGE", issued as U.S. Pat. No. 6,173,992 on Jan. 16, 2001.

FIELD OF THE INVENTION

The present invention is directed to a dual side album leaf and method and apparatus for making the album leaf.

BACKGROUND OF THE INVENTION

Prior art photographic albums typically require the consumer to manually insert conventional prints into a classic sleeve, or use adhesive to bond conventional prints to blank album pages. This is a time consuming, difficult operation that provides less than satisfactory results. Consumers often procrastinate and do not place prints in albums when they receive them from the photofinisher, risking loosing time and event references. A further disadvantage in the prior art photographic albums is that the pages are not uniform in texture, the reflections from the plastic sleeves interfere with viewing, and are prone to tearing. When adhesives are used to maintain the prints in the album, alignment becomes critical. Additionally, many adhesives can damage a print and often fail after time, thus, allowing the prints to fall out of the album. In addition, the multiple layers make for very thick album pages, thus limiting the number of images that can be stored in a given album. Also, in addition to purchasing separate binder album pages, adhesive and other items are sometimes required to be purchased.

It is known in the art to bind prints in a single album, such as a Qualex Galaxy Print Book, but this is limited to one image per single sided page.

It is also known in the art that montage prints can be made by digital and conventional optical techniques. However, these montage prints are limited in that they are only available in single-sided form and not specifically designed for use directly into an album.

It has been disclosed in U.S. Pat. No. 5,791,692 that a dual sided album leaf can be made by folding of a sheet having images on one side so as to produce a single album leaf having images on both sides. While this invention has provided a method of producing images on both sides of an album leaf made of photographic media, there is still a need to provide a method and apparatus for producing multiple album pages in a continuous manner both on photosensitive media and standard media.

The present invention solves many of the problems of the prior art that provides a method of making a unitary dual sided album leaf which is relatively easy to produce, relatively thin in construction, on both photosensitive and standard media, and requires no further mounting by the user.

SUMMARY OF THE INVENTION

In accordance with one aspect of the present invention there is provided a replaceable printing cartridge for use in a printer having a defined processing path along which a media travels, the replaceable printing cartridge being positioned on the printer for printing on the media and is capable of being removed without disturbing the processing path, comprising;

a first print mechanism for printing on the first printing side of the media; and a second print mechanism for printing of the media.

The above, and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
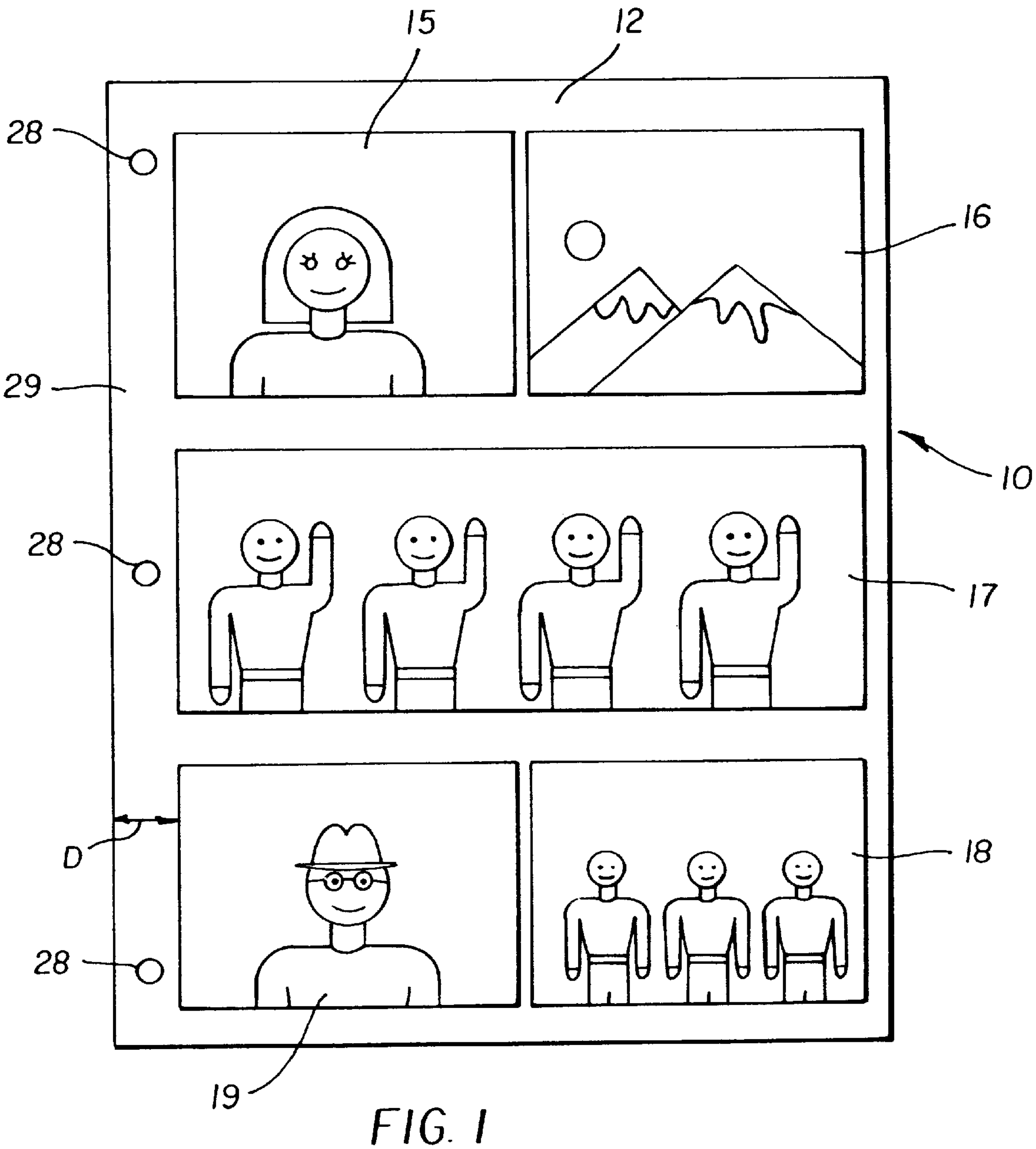
FIG. 1 is a front elevational view of an album leaf made in accordance with the present invention.
Figure 2:
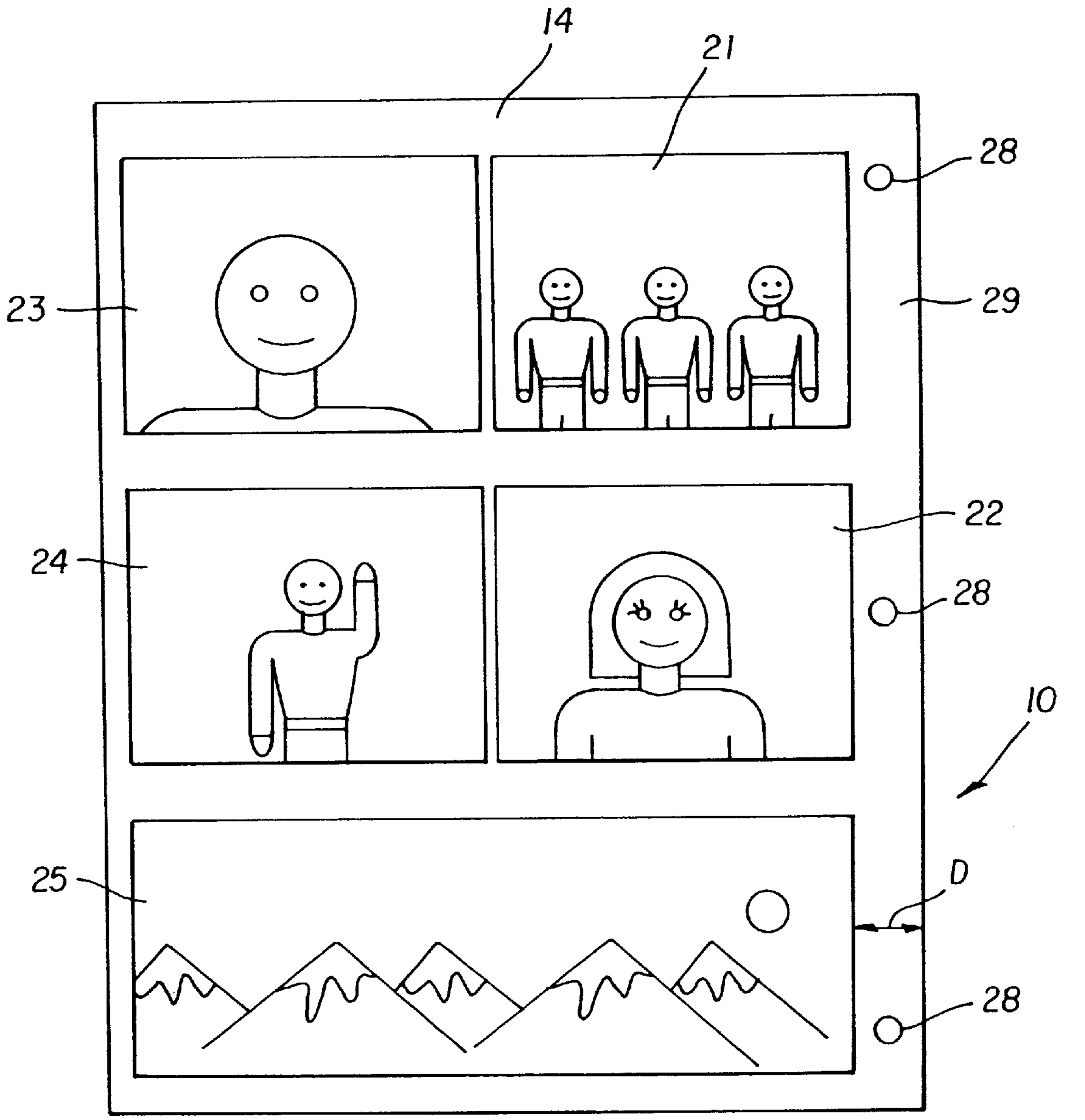
FIG. 2 is a back elevational view of the album leaf of FIG. 1.

Referring to FIGS. 1 and 2, there is illustrated the front and back sides of a dual sided integral album leaf 10 made in accordance with the present invention. In particular, the leaf 10 includes a first side 12 and a second side 14. First side 12 includes a plurality of images 15, 16, 17, 18, 19 and the second side includes a plurality of images 21, 22, 23, 24, 25. Also provided in the preferred embodiment is a plurality of holes 28 in marginal area 29, which can be used for mounting of the leaf in an album. The width D of the margin 29 may be of any desired size. In the particular embodiment illustrated, the width D is approximately 1 inch (2.54 cm).

As can be seen by FIGS. 1 and 2, the various images are composed so that the images substantially fill the space on each side 12, 14. Also, as illustrated, various combinations and sizes of images may be placed together, for example, as illustrated in FIG. 1, the images 15, 16, 18, 19 are substantially identical in size, whereas image 17 is of a different size and format. Images 15–19 have been either automatically composed by a printing device, or printed in accordance with customer instructions. In FIG. 2 the images 21, 22, 23, and 24 have the same format and size whereas image 25 is of a different format and size.

Figure 3:
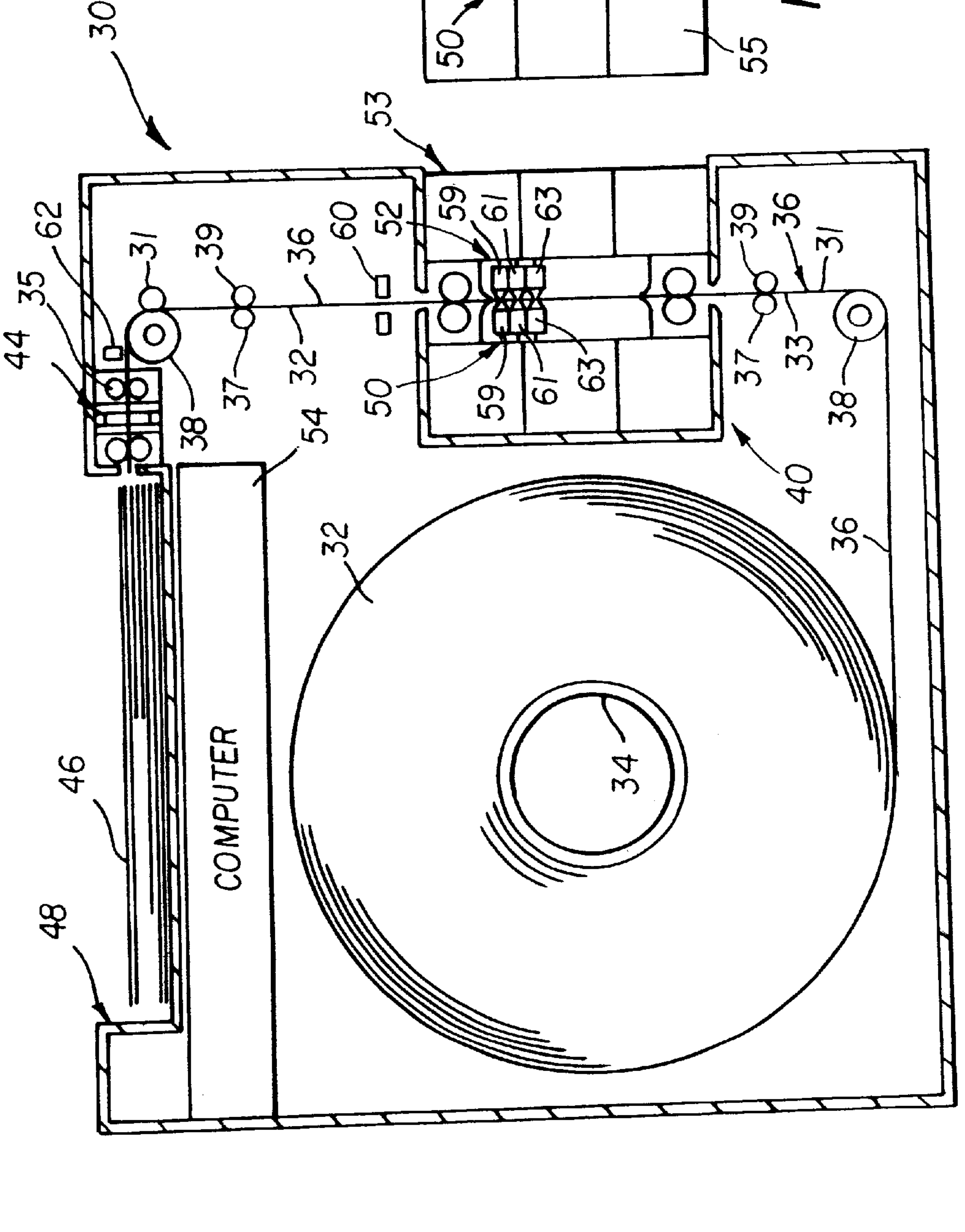
FIG. 3 is a schematic elevational view of an apparatus for making the album leaf of FIGS. 1 and 2.

FIG. 3 illustrates an apparatus 30 made in accordance with the present invention for printing and forming dual album leaf 10. In particular, apparatus 30 prints images onto both sides 31, 33 of a web 32 as it moves past printing section 40. The web 32 may be made of any material suitable for printing images thereon. In the particular embodiment illustrated, the web 32 is made of paper, such as inkjet paper or conventional paper used in inkjet-type printers. The web 32 is wound about a reel core 34 rotatably mounted to apparatus 30. The web 32 moves from reel core 32 along processing path 36 to printing section 40. Guide rollers 38 are provided for guiding of the web 32 along path 36. Images are printed on web 32 as it moves printing section 40. The web 32 may be driven by any appropriate transport mechanism along path 36, for example by rotation of the reel core 34 or by appropriate pinch rollers 37, 39 provided along the printing path 36. It is to be understood that any desired or appropriate transport mechanism may be used for moving of web 32 as is currently done or may come available in the future. The apparatus 30 includes a computer (central processing unit) 54 for controlling operation of the device as is customarily done. A cutting mechanism 44 is provided after the printing section 40 for cutting the web into individual leafs 10 of predetermined size, which are fed into a retaining section 48 from which the leafs 10 are to be placed. As illustrated, printed leafs 10 placed in retaining section 48 may be of various sizes as dictated by the customer order and/or setup of the apparatus.

Figure 4:
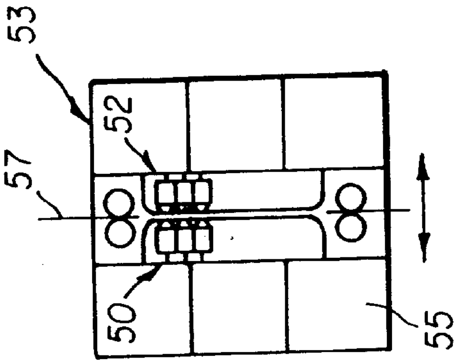
FIG. 4 is a schematic elevational view of a replaceable print cartridge for use with the apparatus of FIG. 3.

Printing section 40 includes a first printer mechanism 50 disposed on one side of the web 32 and a second printing mechanism 52 disposed on the opposite opposed side of the first printing mechanism 50. In the particular embodiment illustrated, the first and second printing mechanism 50, 52 may be combined as a single replaceable printing cartridge 53, as illustrated in FIG. 4. The cartridge 53 comprising a cassette body 55 in which the printing mechanisms 50, 52 are mounted. The cassette body includes a printing path 57 that is in co-alignment with processing path 36 and is designed to receive web 32. In the embodiment illustrated each printing mechanism 52 has a pair of print head assemblies for printing on web 32 which are disposed such that printing occurs at substantially the same point on both sides of the web 32 as the web 32 passes through cassette body 55. In the particular embodiment illustrated, the first and second printing mechanisms 50, 52 each comprise a plurality of inkjet nozzles 54, 56, 58 so that the printing mechanisms 50, 52 are capable of producing color images. However, it is to be understood that any number of nozzles may be provided and the printing mechanisms 50, 52 may print color or any other appropriate visual spectrum desired.

In the preferred embodiment illustrated, the first and second printing mechanisms 50, 52 are provided in the form of a single replaceable printing cartridge 53. However, the present invention is not so limited and printing mechanisms 50, 52 may be provided as two individual separate cartridges or may be secured directly to the apparatus 30 if so desired. The benefits of providing a single printing cartridge 53 is that the printing heads are precisely positioned with respect to each other so that the images will be printed in a relatively accurate position and with respect to each other on the web 32.

The first and second printing mechanisms 50, 52 are connected to computer 54, which provides the appropriate image data for printing of the images onto the web 32. The computer 54 may obtain the image order in any desired manner. For example, but not by way of limitation, the image order may be obtained from a kiosk or remote computer through a communication network such as the Internet, whereby the apparatus 30 obtains the order and prints the images in accordance with the customer order. Further, apparatus 30 may be provided with other appropriate input device or scanner for capturing of images and may also include data entry means (not shown) for allowing a consumer or operator to compose the images on the album leaf as desired. The apparatus 30 may be part of a larger device or system, such as Kiosk or photofinishing minilab. Each leaf 10 is made with any desired number of images and placed in any desired position on each side of leaf 10.

In the embodiment illustrated, a metering roller 35 is provided so that the images and/or leafs will be separated from web 32 at the desired location. Marking means for producing a mark on web 32 at the beginning and end of an album leaf and/or image is provided. An appropriate sensor 62 is provided adjacent the cutter mechanism 42 for sensing the mark. For example, the marking means may comprise a hole punching mechanism 60 which may be provided for providing of a mark (hole) for indicating where on the web 32 should be cut by cutting mechanism 44. Sensor 62, adjacent cutting mechanism 44, senses the mark and sends a signal to computer 54. Computer 54 then controls cutting mechanism 44 for cutting of the web 32 at location identified by the mark. The prints and/or leafs are then fed into the retaining section 48. It is, of course, understood that the marking mechanism is not be limited to the providing of a hole. For example, but not by way of limitation, a visual or a magnetic readable mark may be provided which is capable of being sensed. Once the mark is sensed by sensor 60 the cutting mechanism 44 is activated at the appropriate time to cut the web at the appropriate location.

Figure 5A:
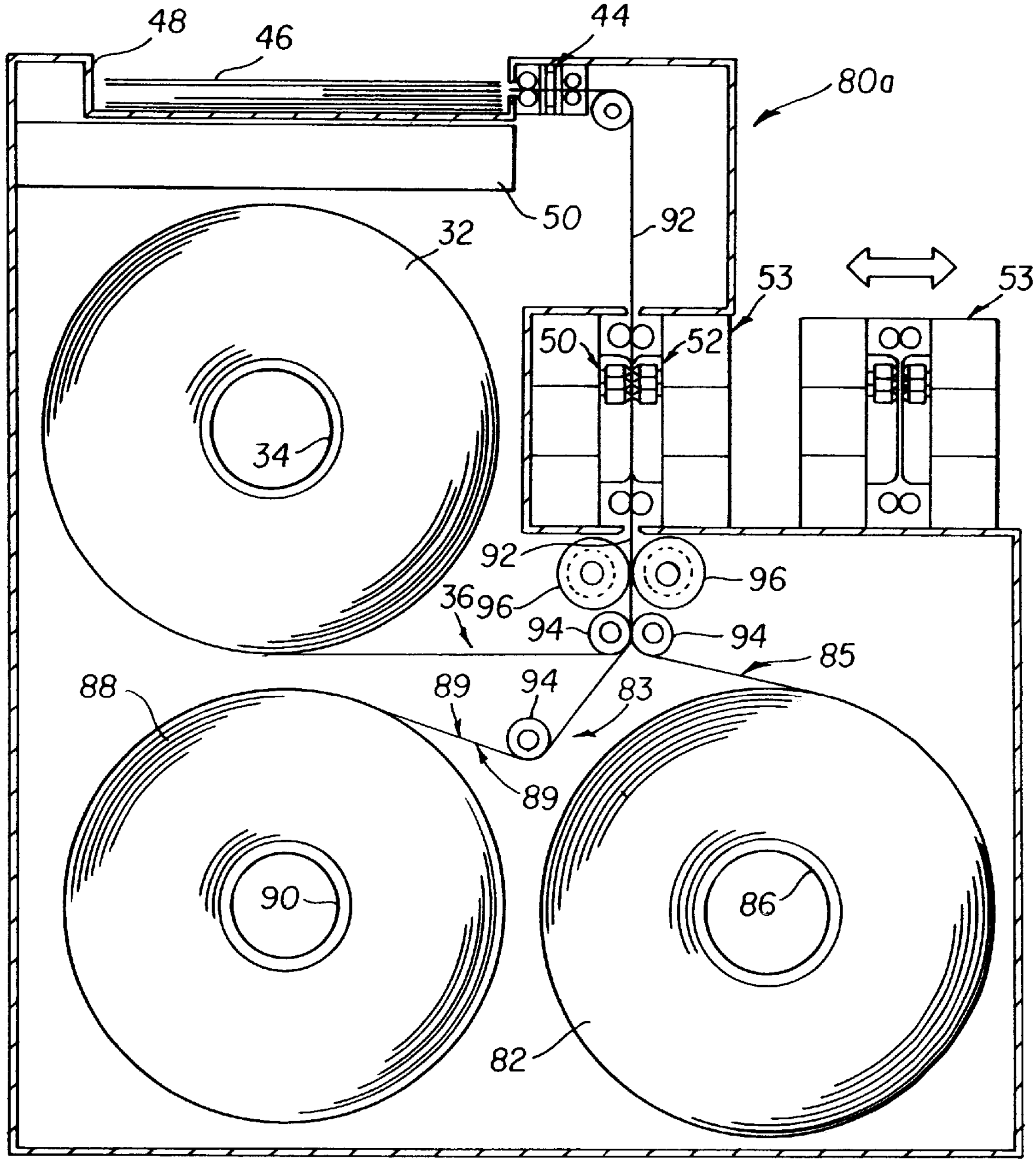
FIG. 5*a* is an elevational schematic view of a modified apparatus made in accordance with the present invention also designed to make the album leaf of FIGS. 1 and 2.

Referring to FIG. 5*a* there is illustrated a modified apparatus 80*a* made in accordance with the present invention similar to apparatus 30, like numerals indicating like parts and operation, as discussed with respect to apparatus 30. In this embodiment, in addition to web 32 there is provided a second web 82 of material helically wound on a second reel core 86, the core 86 being rotatably mounted to apparatus 30. A third adhesive web 88 is helically wound about on reel core 90, the core 90 also being rotatably mounted to apparatus 30. The adhesive web 88 is designed for adhesively securing webs 32 and 82 so as to form a merged unitary integral web 92. The adhesive web 88 is such that both sides 89 have an adhesive material applied thereon which is suitable for adhering the webs 32 and 82 together. An appropriate transport mechanism is provided for moving of webs 82 and 88 along processing paths 83 and 85, respectively. The processing paths 36, 83, and 85 to merge together at merge section 91 to form a single processing path which continues through the apparatus 30. Appropriate guide rollers 94 are provided for guiding of the webs 32, 82 and 88 along their respective paths 36, 83 and 85. A pair of pressure rollers 96 are provided in merge section 91 for applying a force sufficient to cause the adhesive web to secure webs 32 and 84 together in to single unitary integral web 92. In the embodiment illustrated guide rollers 94 also function as drive rollers for advancing of the webs. Thereafter, the web 92 passes through the printer and apparatus in the same manner as discussed with regard to apparatus 30. The construction of apparatus 80*a* allows the providing of a single unitary web 92 of a desired weight and thickness to give the desired feel. Additionally, apparatus 30 allows for the ability of using media, which is not capable of being easily printed on both sides thereof. Thus, if the media has one surface which is capable of or more receptive to printing, high quality images can be obtained on both sides of the merged web 92.

Figure 5B:
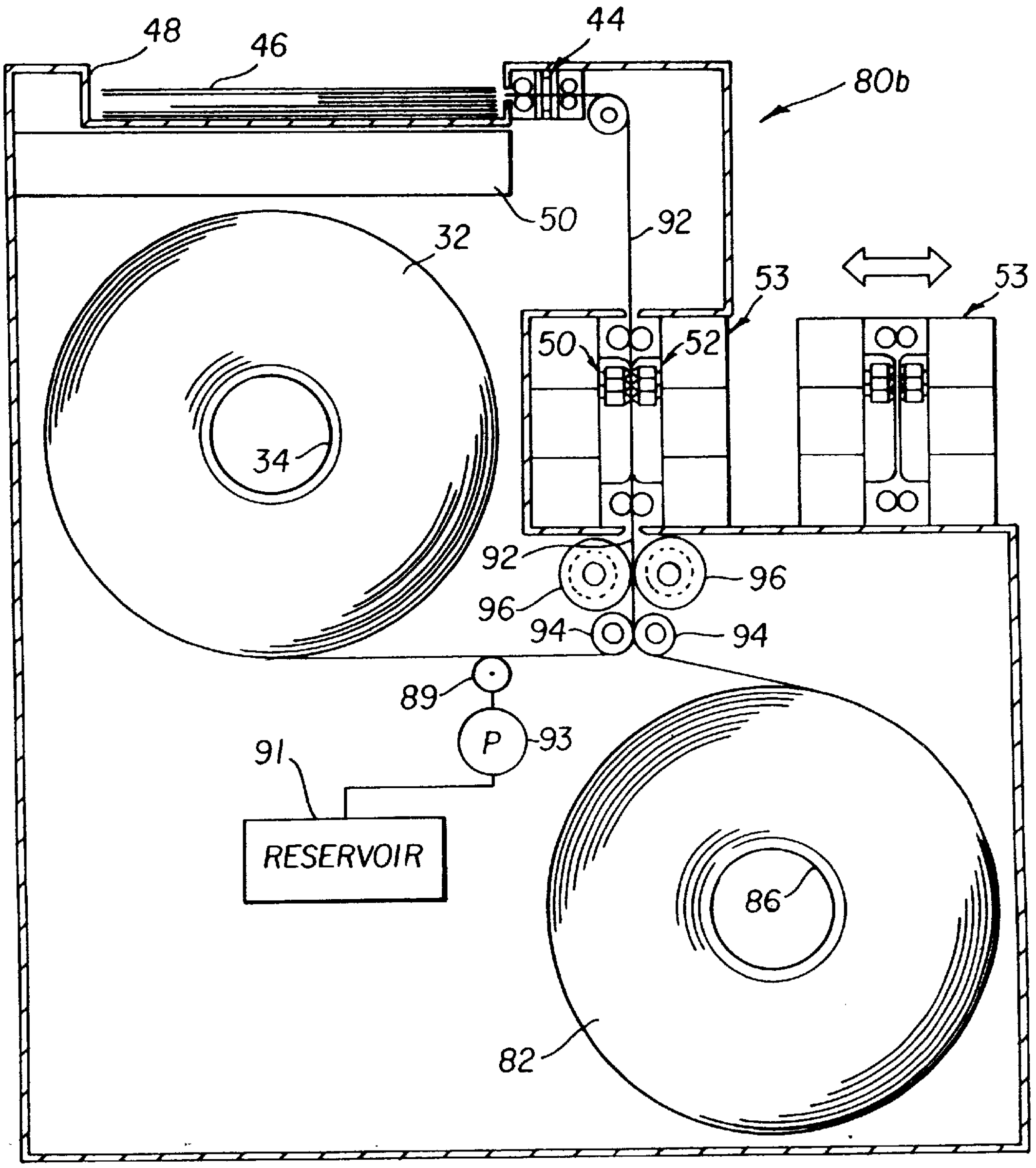
FIG. 5*b* is an elevational schematic view of yet another modified apparatus similar to that of FIG. 5*a* made in accordance with the present invention for making the album leaf of FIGS. 1 and 2.

It is to be understood that the webs 32 and 82 may adhere together by any suitable adhesive using any desired application technique. For example, but not by way of limitation, in place of adhesive web 88, an adhesive may be applied to one or both webs 32, 82 by spraying the adhesive thereon or by using a roller applicator. Referring to FIG. 5*b* there is illustrated a modified apparatus 80*a* which is similar to apparatus 80 like parts indicating like parts and operation. In this embodiment, an applicator roller 89 is provided for applying an adhesive provided in a reservoir 91 and which is supplied to roller 89 by a pump 93.

Figure 5C:
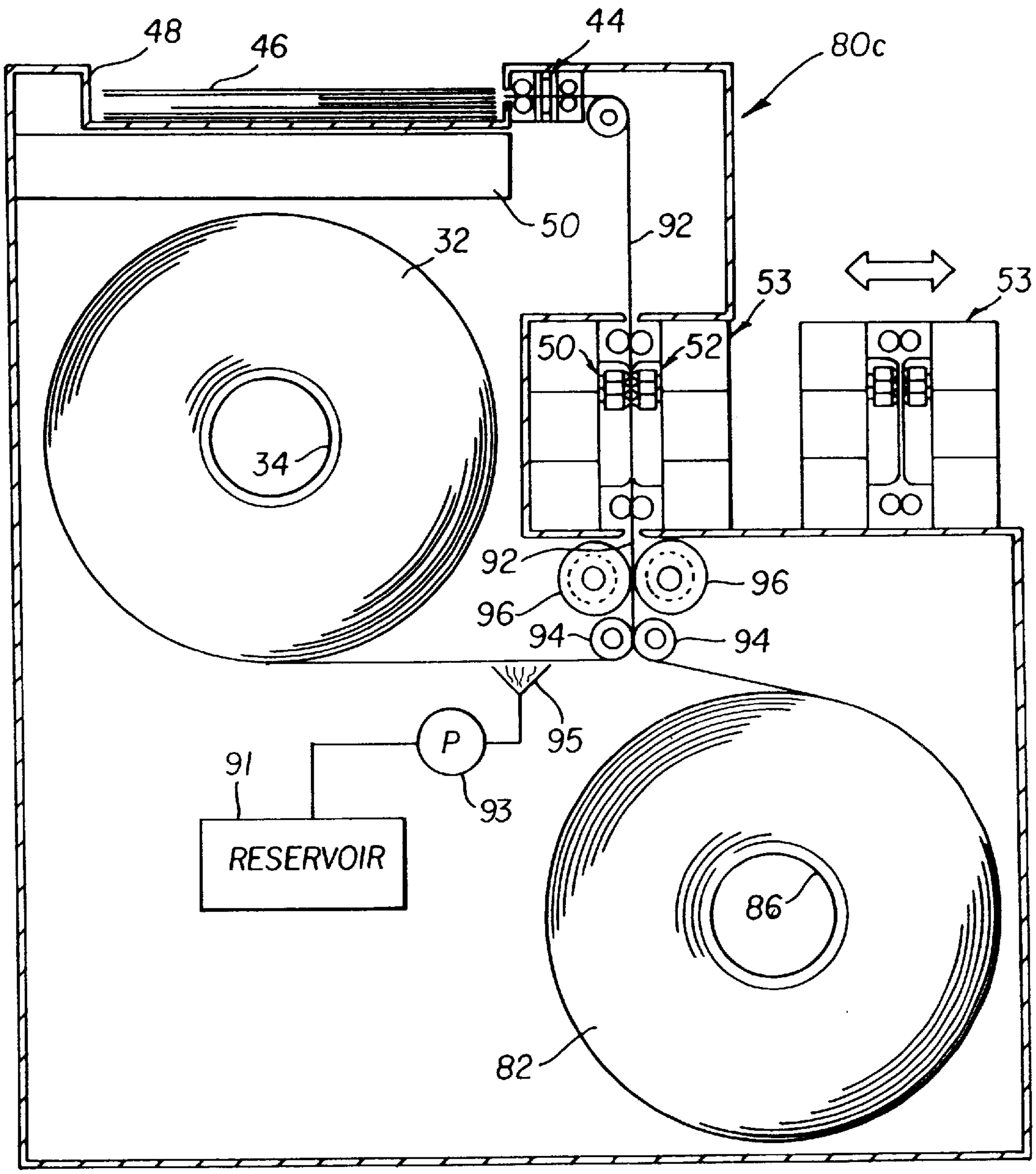
FIG. 5*c* is an elevational schematic view of still another modified apparatus similar to that of FIG. 5*a* made in accordance with the present invention for making the album leaf of FIGS. 1 and 2.

Referring to FIG. 5*c* there is illustrated yet another modified apparatus 80*c* which is similar to apparatus 80*a* like parts indicating like parts and operation. In this embodiment adhesive is sprayed on to the back side of web 32 using a spray nozzle 95. It is to be understood that the webs 32 and 82 may be secured together using any appropriate technique and/or mechanism.

Figure 6:
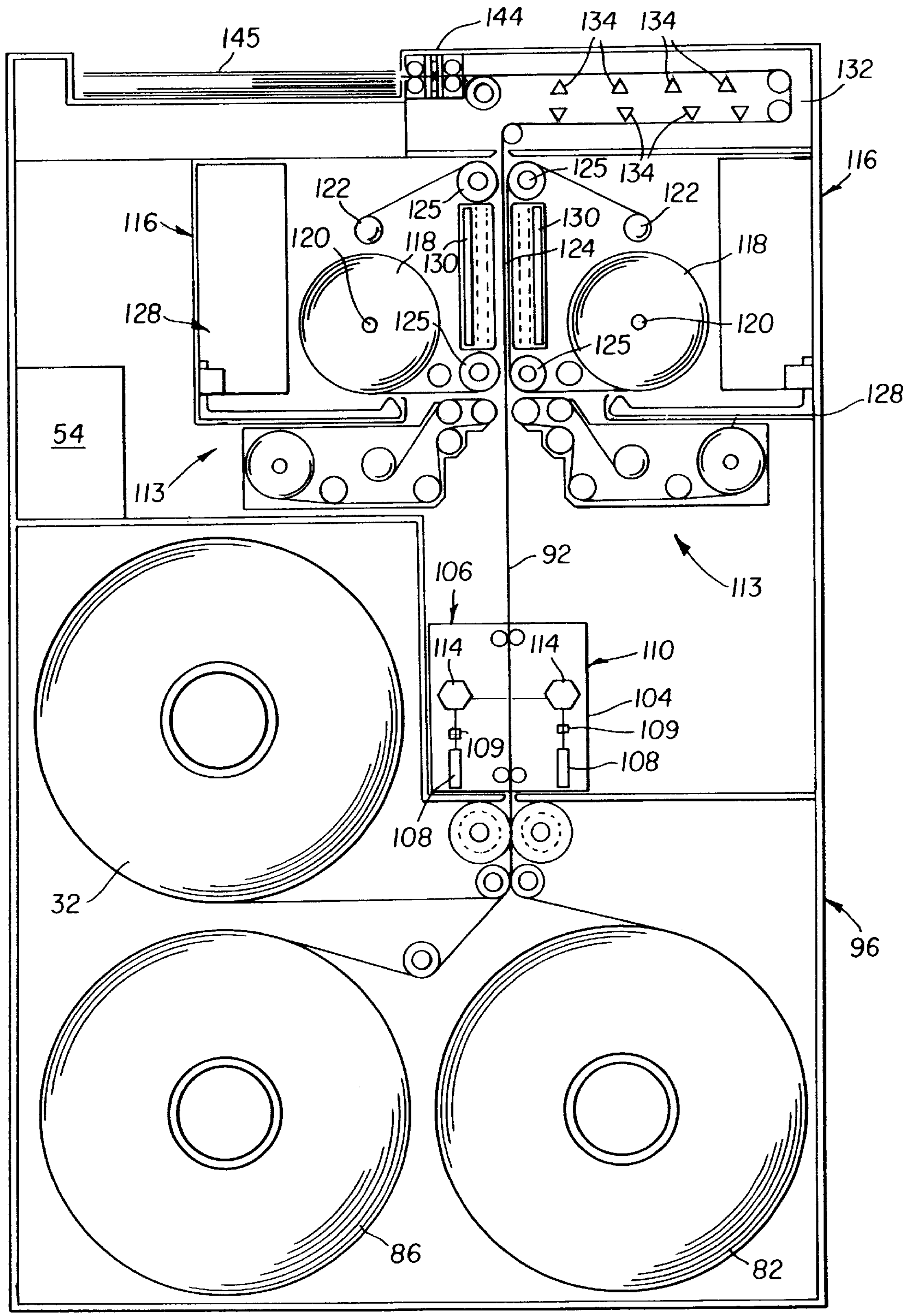
FIG. 6 is a schematic elevational view of yet another modified apparatus made in accordance with the present invention used to make the album leaf of FIGS. 1 and 2.

Referring to FIG. 6, there is illustrated another modified apparatus 96 made in accordance with the present invention. Apparatus 96 is similar to apparatus 80*a*, like numerals indicating like parts and operation as previously discussed. In this particular embodiment, the webs 32 have a photosensitive side 100 and a non-photosensitive side 101, the non-sensitive side being bound together in the same manner previously discussed with respect to the embodiment of FIG. 5*a*. In this embodiment, the webs 32, 82 are made of a photosensitive material. In particular, webs 32, 82 are photographic paper wherein the side 100 contains a photosensitive emulsion layer. The emulsion layer may be of any type as is currently suitable or may become suitable for use. In this particular embodiment, the apparatus 98 includes a printing section 110 for exposing digital images provided in digital form onto the merged photosensitive web 92. In the particular embodiment illustrated, printing on the media is accomplished by a pair of laser printers 104, 106 for exposing images on both sides of the merged media 102. Laser printers 104, 106 are each connected to computer 54 that provides the appropriate digital data for printing of the image on to web 92. Briefly, the laser printers 104, 106 are each provided with an appropriate laser light source 108 which emits a writing light beam 112. The beam 112 is directed to a rotating polygon 114 that reflects the light on to web 92. A modular 109 is provided for modulating the light beam with appropriate digital data received from computer 54.

The web 92 after leaving the printing section 110 is passed onto a development section 113 where the exposed images on web 92 are developed. In the embodiment illustrated the images are developed by a pair of developers 116 provided on both sides of the web 92. Each developer 116 is provided with donor web 118 that is helically wound on supply reel 120. The donor web 118 extends from supply reel to take-up reel 122 along processing path 124. Guide rollers 125 guide the donor web 118 along path 124. The take-up reel 122 is connected to a drive motor (not shown) for unwinding web 118 from reel 120 and taking it up on take-up reel 122. An application system 128 is provided for applying a processing solution on donor web 118. The processing solution is such that it will develop the exposed images on web 92. A pressure applicator mechanism 130 is provided for applying a biasing force on the donor web 118 against the photosensitive web 92 so that the processing solution on donor web 118 will contact the emulsion on the photosensitive web 92 so as to develop the images thereon. A detailed description of the operation of a similar type process is disclosed and described in co-pending patent application (attorney docket No.79782/F-P) entitled "Method and Apparatus for Photofinishing a Photosensitive Media and/or Ordering of Image Products" by Joe Manico et al., filed concurrently with this application. After development the web 92 is dried by dryer 132 and forwarded to cutter 44 and then to receiving tray 145.

Figure 7:
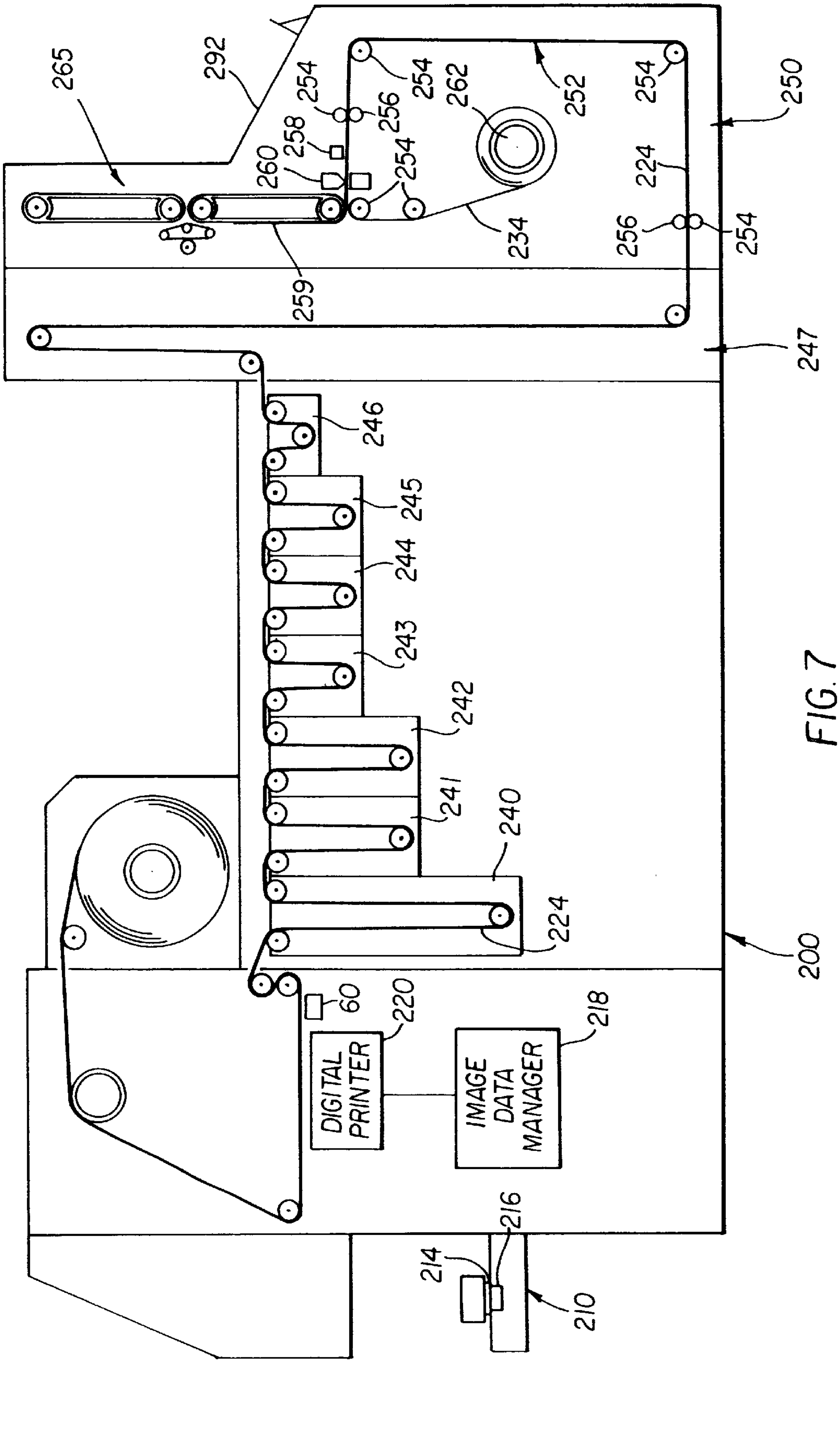
FIG. 7 is a schematic elevational view of another apparatus made in accordance with the present invention for making an album leaf made from a photosensitive media.

Referring to FIG. 7 there is illustrated yet another apparatus 200 made in accordance with the present invention, like numerals indicating like parts and operations as previously discussed. Apparatus 200 is an apparatus for printing on to a photosensitive media, such as photographic paper, and developing the images that are written photographic media, typically referred to as a photographic minilab. The images to be printed may be obtained from any source. In the embodiment illustrated the images are obtained from scanning a photosensitive media having images thereon. The apparatus 200 is also designed to automatically produce an integral album leaf 10. In particular, apparatus 200 includes a printing section 210 where a developed photosensitive media 212, which in the embodiment illustrated is photographic film 214, is passed through a digital scanner 216 for obtaining a digital record of the images on the film 214. The scanner 216 may be of any desired construction. In the embodiment illustrated scanner 216 uses CCDs (charge couple devices) for digitally capturing of the images. The images obtained by scanner 216 are forwarded to image data manager 218 where the digital images are organized and manipulated as programmed by the operator and/or in accordance with customer instructions. The images are grouped into separate customer orders as is customarily done with minilabs. The digital images are forwarded to a digital printer 220 which writes the images on to a photosensitive media. The digital printer 220 may take any desired form, for example but not limited to, CRT printer, a laser printer, a liquid crystal printer, a LED printer. A marking mechanism 225 is provided for placing positioning marks on the paper 24 for indicating the position on the paper that is to be cut for separating the print from the paper web. In the embodiment illustrated, the photosensitive media comprises specially designed photographic paper 224.

Figure 8:
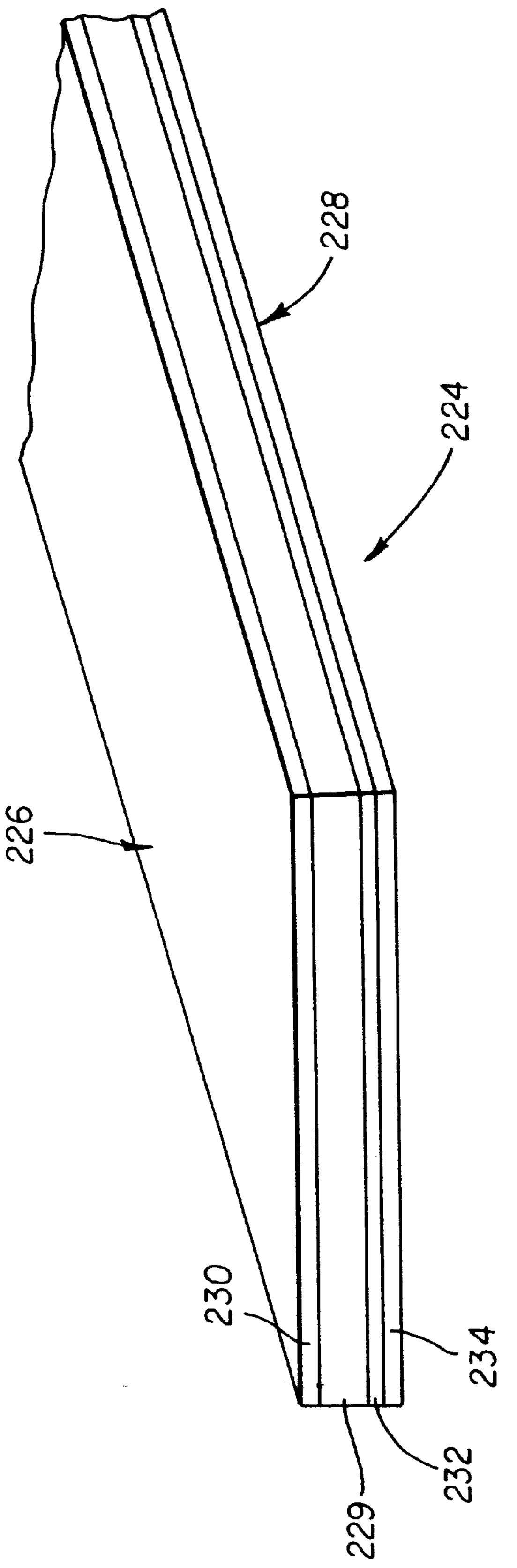
FIG. 8 is an enlarged partial perspective view of the photosensitive media used in the apparatus of FIG. 7.

Referring to FIG. 8 there is illustrated in greater detail the construction of photographic paper 224. In particular photographic paper 224 comprises a front side 226 and a back side 228. The paper 224 comprises a supporting substrate 229 on which a photosensitive emulsion layer 230 is provided on the front side 226. The photosensitive emulsion layer 230 is designed to have images written thereon. An adhesive layer 232 is provided on the other side of substrate 229. A protective release layer 234 is provided that covers the adhesive layer 232. The photographic paper 224 is capable of being passed through a photographic development process where images exposed on the paper are developed as is customarily done. The release layer 234 protects the adhesive layer 232 during processing of the photoprocessing paper and which when removed after processing of the photosensitive emulsion layer 230, the adhesive layer 232 is exposed for use. A more detailed description of a suitable paper is described in co-pending U.S. patent application entitled "Photographic Member With Readable and Repositioning Adhesive Layer" of R. F. Cournoyer, Robert Paul Bourdelais, and Peter Thomas Aylward, Ser. No. 09/196,545 filed Nov. 2, 1998 which is hereby incorporated by references.

Referring back to FIG. 7, the paper 224 passes through a plurality of processing tanks 240, 241, 242, 243, 245, 246, each an appropriate processing solutions is well known in the art of photography. Thereafter the paper 224 is passed through a drying section 247 where it is dried. The dried paper 224 is then sent to a finishing section 250 wherein album leafs 10 are automatically made.

Referring to FIGS. 7 and 9*a*–9*h* there is illustrated finishing section 250. The finishing section 250 includes an appropriate transport mechanism for transporting the paper 224 along processing path 252. In the embodiment illustrated, a plurality of guide rollers 254 and drive roller 256 are used. However, any other type of transport mechanism may be used. A sensor 258 is provided for sensing a mark made by marking mechanism 60. This information is used to control cutter 260 for cutting of paper 224 at the desired location forming segment 259 which will be formed into album leaf 10. The segment 259 is provided with a plurality of images which have been composed on a segment 259 so as to define a fold line (not shown) about which the segment 259 will be folded so as to form the leaf 10. The cutter 260 is such that the protective release layer 234 is not cut. This allows the release layer 234 to be easily removed from the cut segment 259. The end of the release layer 234 is wound about a take-up core 262 that is rotatably mounted to apparatus 200. A drive mechanism, not shown, is provided for driving the core 262 at the appropriate speed for taking up the release layer 234 after it has been removed from segment 259. The finishing section 250 includes a folding mechanism 265 for automatically folding segment 259 about the predefined fold line so as to form album leaf 10. In the embodiment illustrated the folding mechanism 265 includes a pair of vacuum belt drive assemblies 266, 268 for moving segment 259 along the end of path 252. Each of the assemblies 266, 268 include a drive belt 270 which moves about a pair of spaced rollers 272. A support plenum 274 is provided between rollers 272 in assembly 266, 268. The belt 270 and plenum 274 of each of the assemblies 266, 268 are provided with appropriate openings (not shown) for allowing a vacuum to be applied so as to drive segment 259 along the processing path 252. The rollers 272 in the embodiment illustrated are vacuum rollers that assist in guiding the segment 259 along the processing path 252. The rollers 272 are connected to a drive mechanism, such as a motor, for moving the belt 270 in either direction about rollers 270. The assemblies 266, 268 are positioned such that the top surface 276 of each of the assemblies are substantially co-linear. Each of the assemblies have a length L and are spaced apart a distance D so as to form an opening 267 therebetween. The distance D of opening 267 is sufficiently large so as to allowed the leaf 10 to pass between the two assemblies 266, 268 as is discussed in detail later herein. Vacuum is applied to the assembly 266, 268 so that the segment 259 will be moved along path 252 as the belt 270 is moved. The folding mechanism 265 further includes a fold-initiating assembly 280 for locating and initiating the folding of segment 259. The fold-initiating assembly 280 comprises three rollers 282, having a release belt 284, which rotates freely about rollers 282. Belt 284 is made of a material similar to release paper 234 such that it can engage and disengage the adhesive layer 232. The rollers 282 are positioned with respect to each other so as to form a generally "V" or "U" shaped engagement section 288 (see FIG. 9*e*) with the point directed toward the opening 267.

Figure 9A:
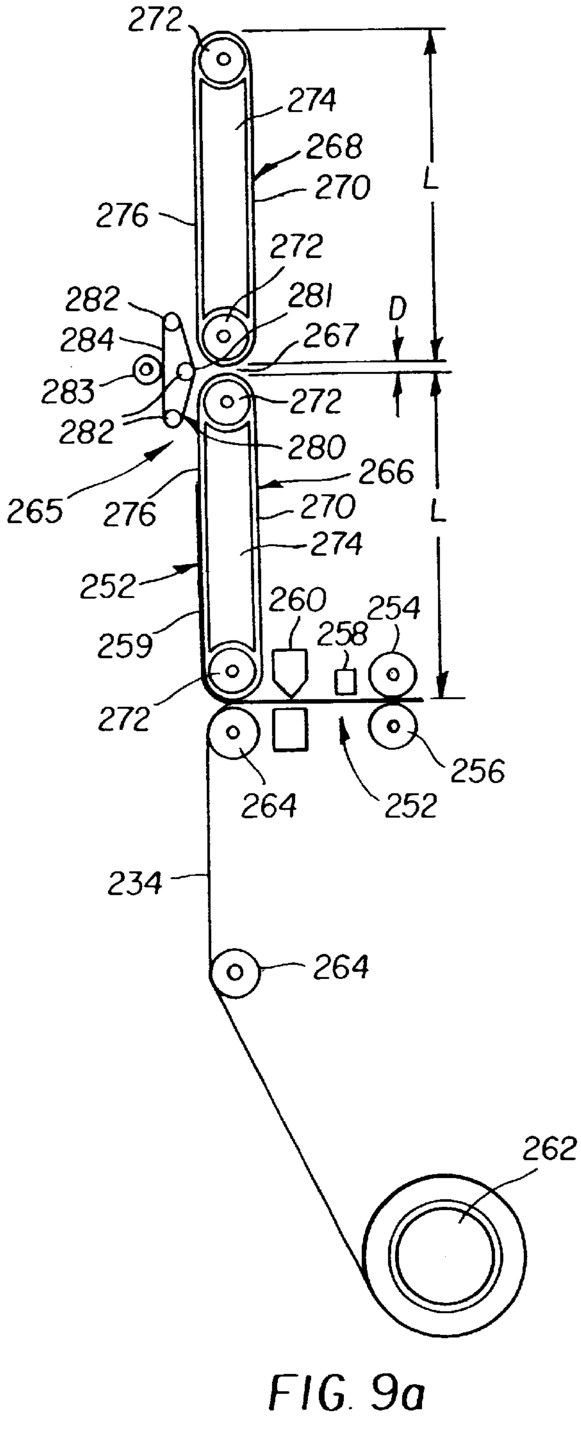
FIGS. 9*a*–9*h* are partial views of the apparatus of FIG. 8 illustrating the folding mechanism used for making of the album leaf, illustrating the sequence of steps in the folding process.
Figure 9B:
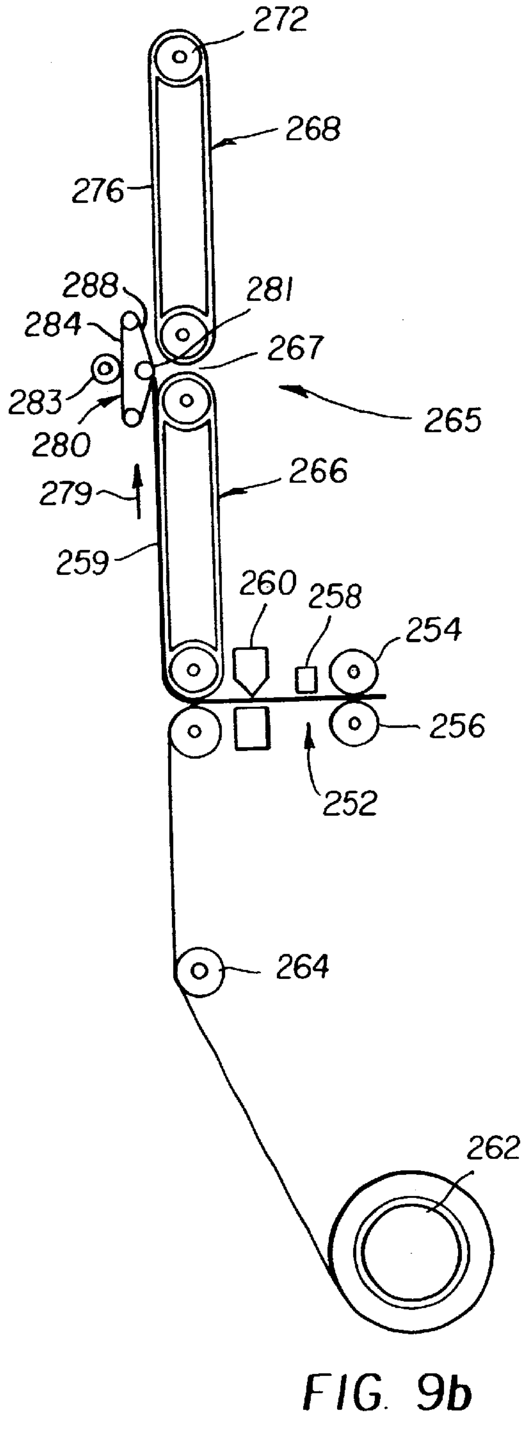
Figure 9C:
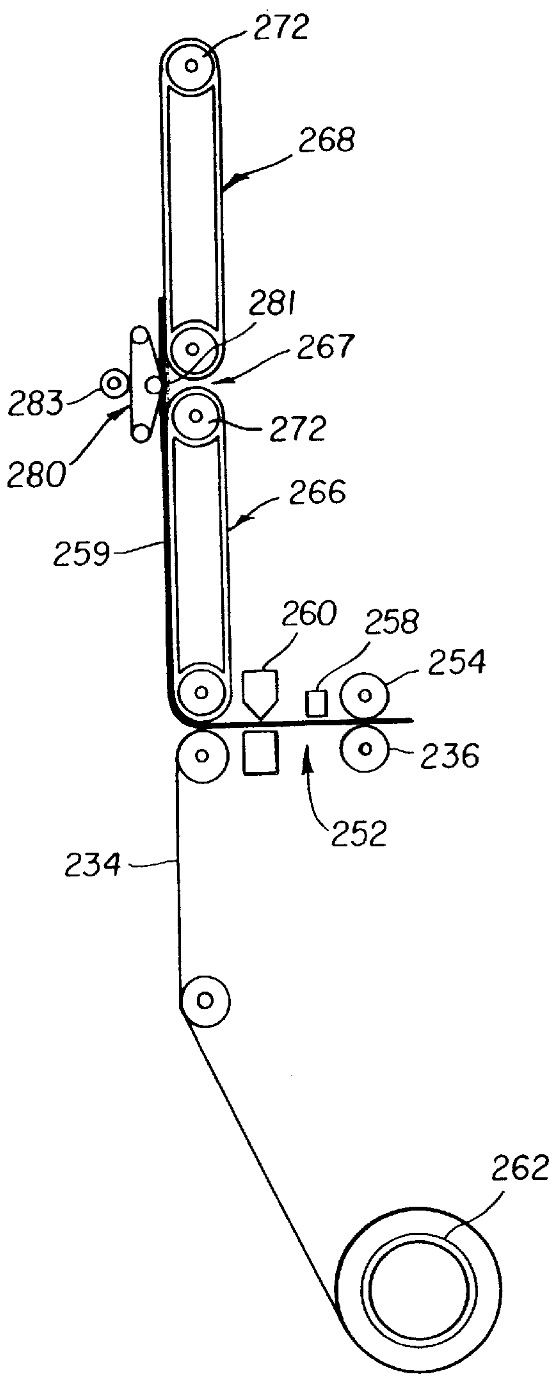
Figure 9D:
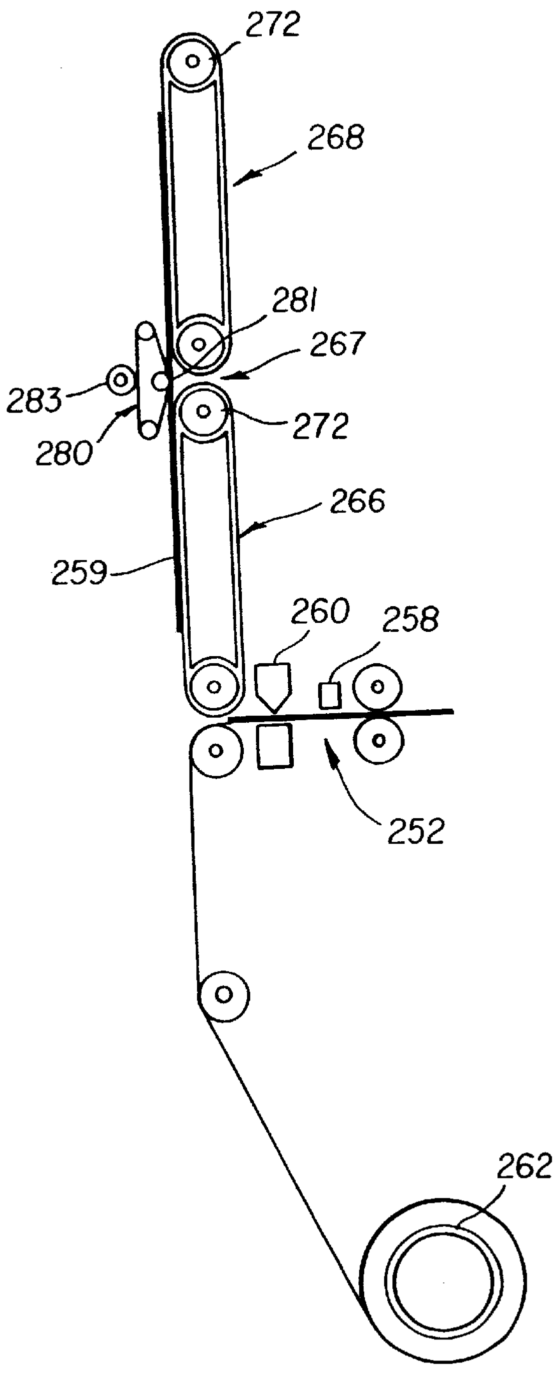
Figure 9E:
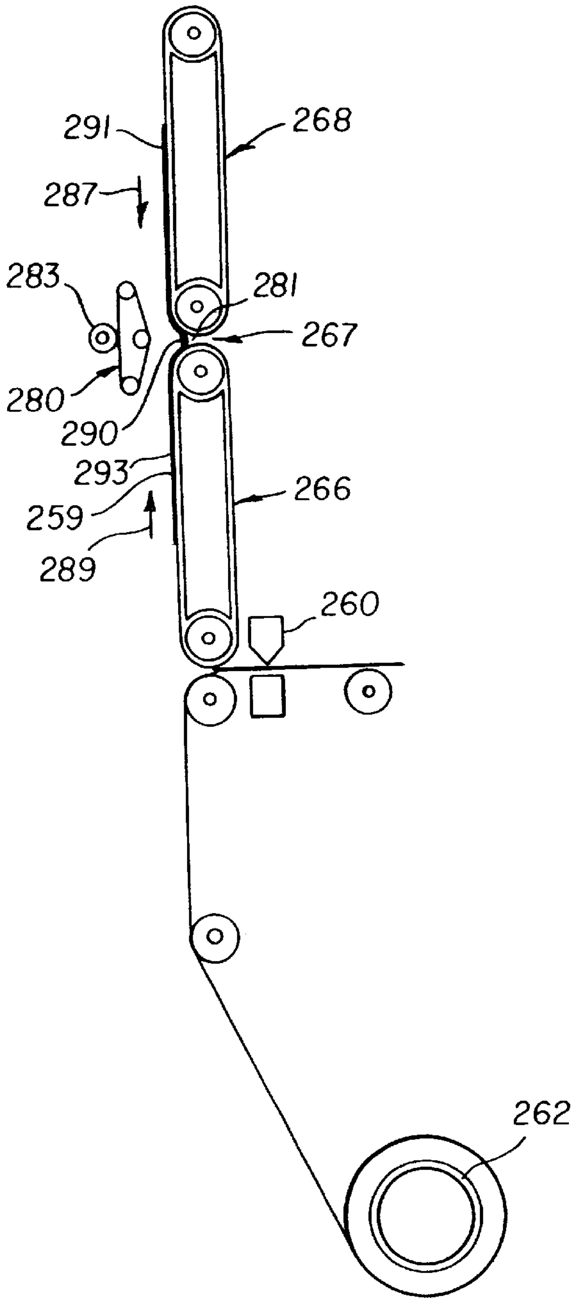
Figure 9F:
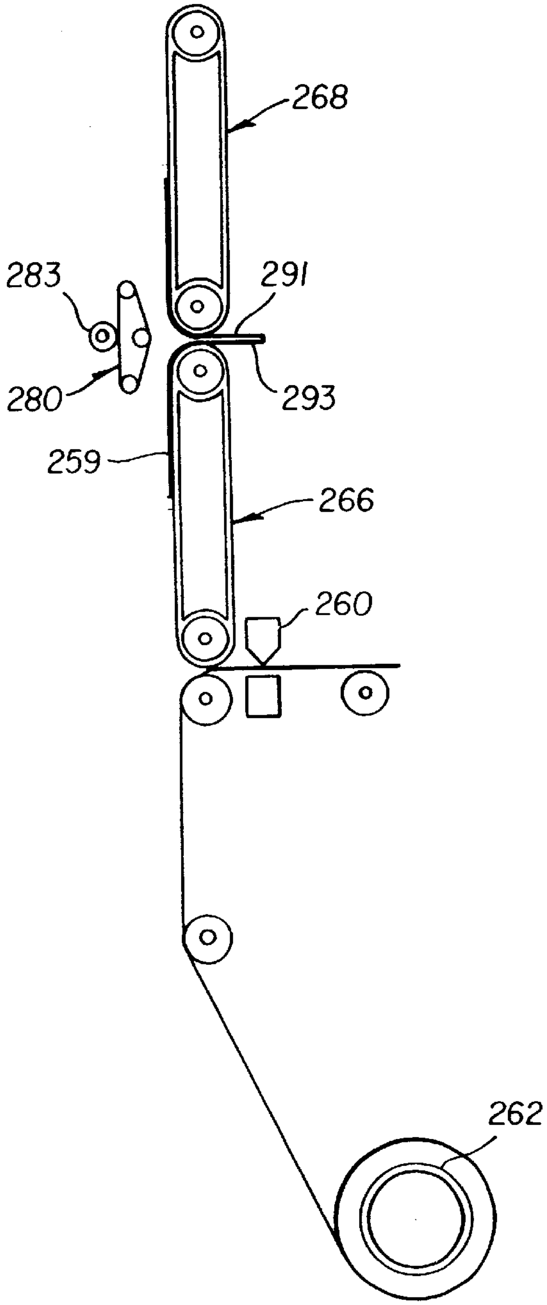
Figure 9G:
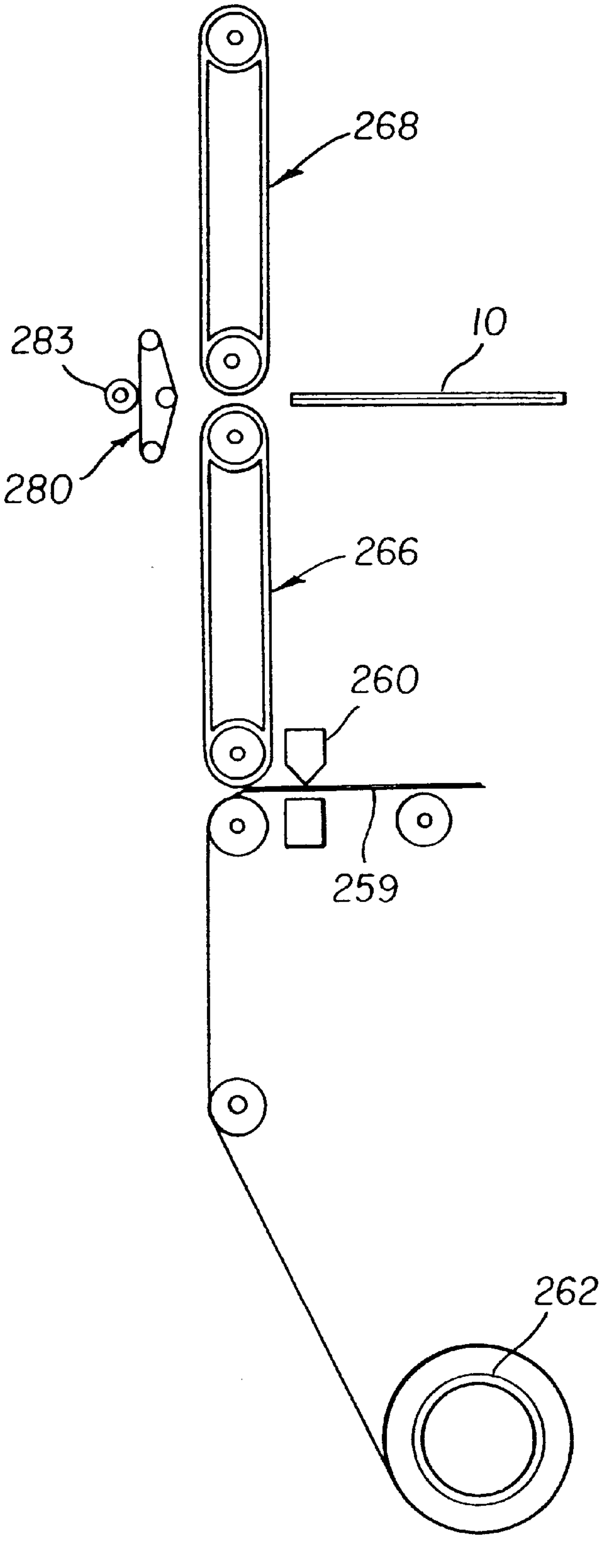
Figure 9H:
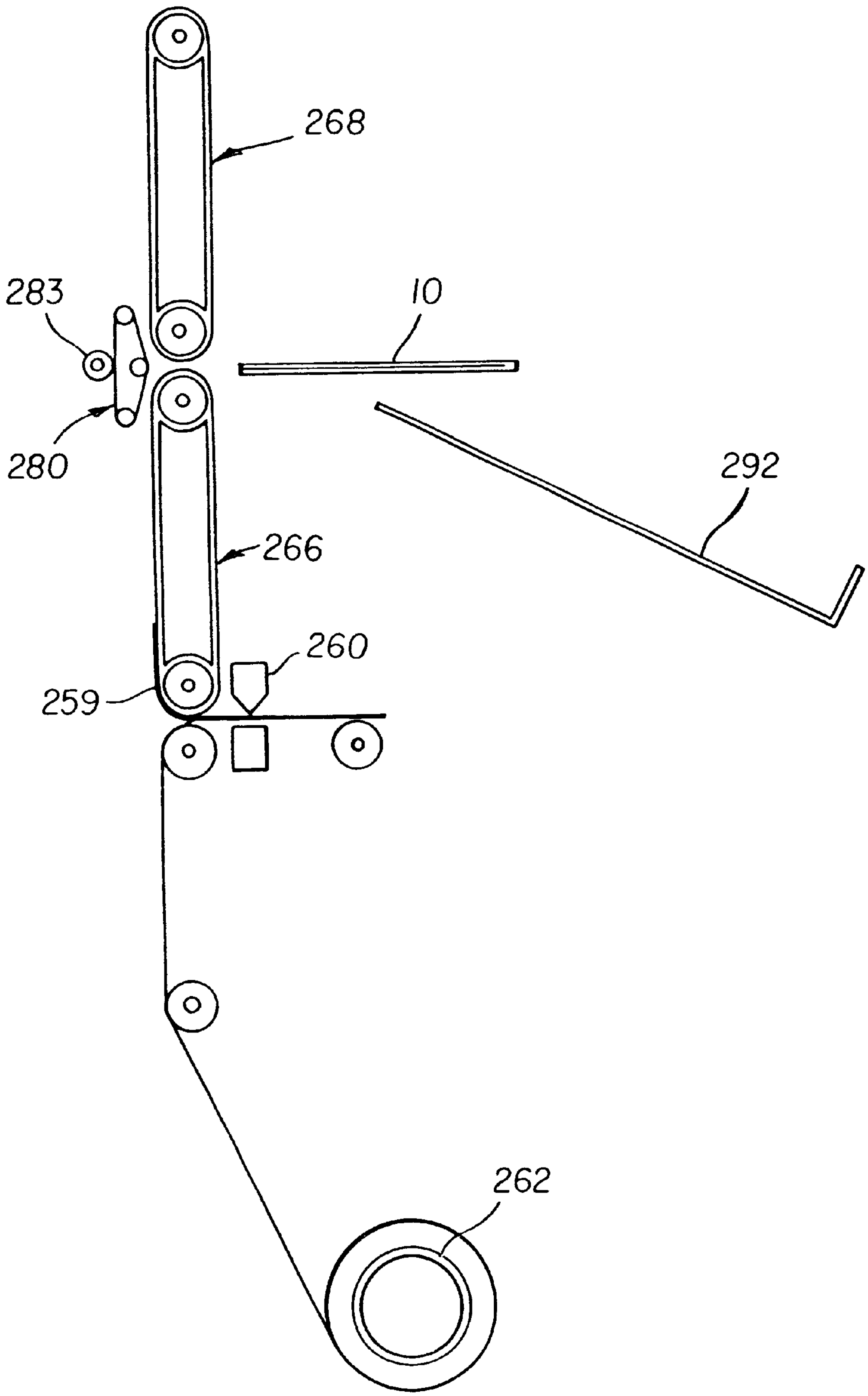

FIGS. 9*a*–9*h* illustrates the sequential steps of automatically folding the segment 259 so as to make an album leaf 10. FIG. 9*a* illustrates the segment 259 after it has been cut. As segment 259 moves past fold-initiating assembly 280, as illustrated by FIGS. 9*b* & 9*c* as indicated by arrow 279, the engagement section 288 engages segment 259. The segment 259 is moved on to the second belt assembly 268 until reaching its stopping point as illustrated by FIG. 9*d*. The positioning of segment 259 is such that the fold line of segment 259 at which the fold is to be formed is positioned in co-alignment with opening 267 and directly below the point 281 of the "V" or "U". The engagement of engagement section 288 of assembly 280 assists in providing continuous contact with the segment 259 until it is positioned for the folding operation. Once the segment 259 is positioned for folding, the fold-initiating assembly 280 is moved toward opening 269 so as to form a fold nipple shaped section 290 (see FIG. 9*d*) in segment 259. The assembly may be any appropriate mechanism. In the embodiment illustrated a cam 283 is used to move 280 toward and away from the belt assemblies 266, 268. Once the nipple shaped section 290 is formed the fold-initiating assembly 280 is moved away from the segment 258, (see FIG. 9*e*). Thereafter, the belts 284 of assemblies 266, 268 are moved in a direction toward the opening 269 (as indicated by arrows 287, 289) so as to cause the lateral sides 291, 293 of segment 259 to come toward each other causing the adhesive layer 232 on each lateral end to adhere to each other to form the album leaf 10 as shown by FIGS. 9*f* and 9*g*. The leaf 10 is then directed to retaining shelf 292 where it is retained until it is picked up, packaged and sent to the customer. If desired a sorter, not shown, may be provided for sorting of leafs according to customer order. The process is repeated for each successive leaf, see FIGS. 9*h* and 9*a*.

Figure 10A:
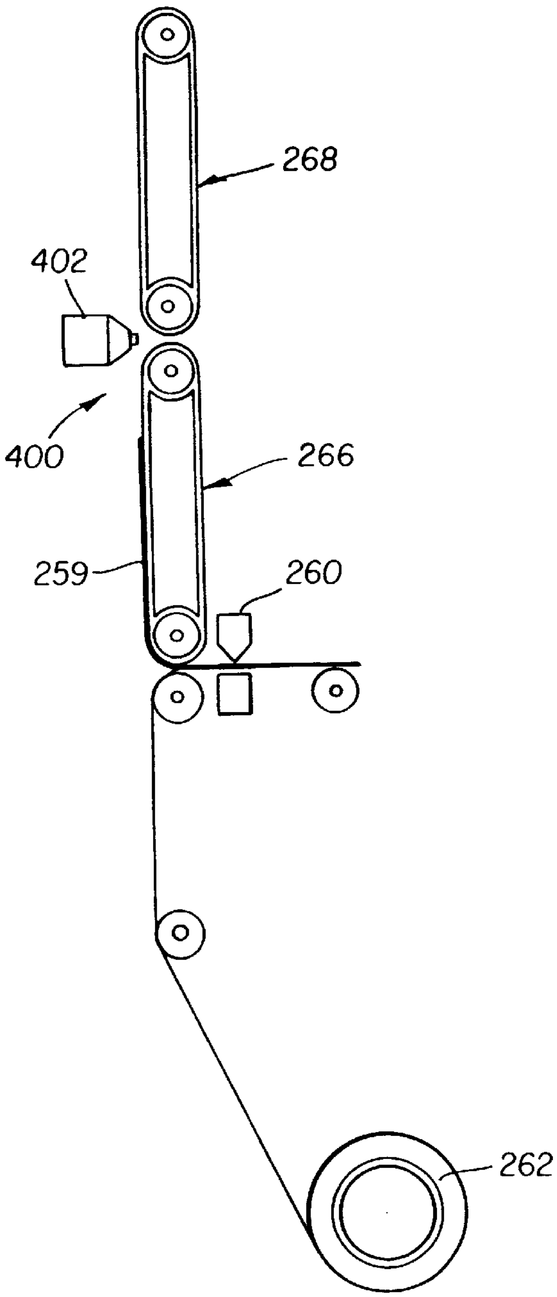
FIGS. 10*a*–10*b* are views similar to FIGS. 9*a*–9*h* illustrating a modified folding apparatus made in accordance with the present invention.
Figure 10B:
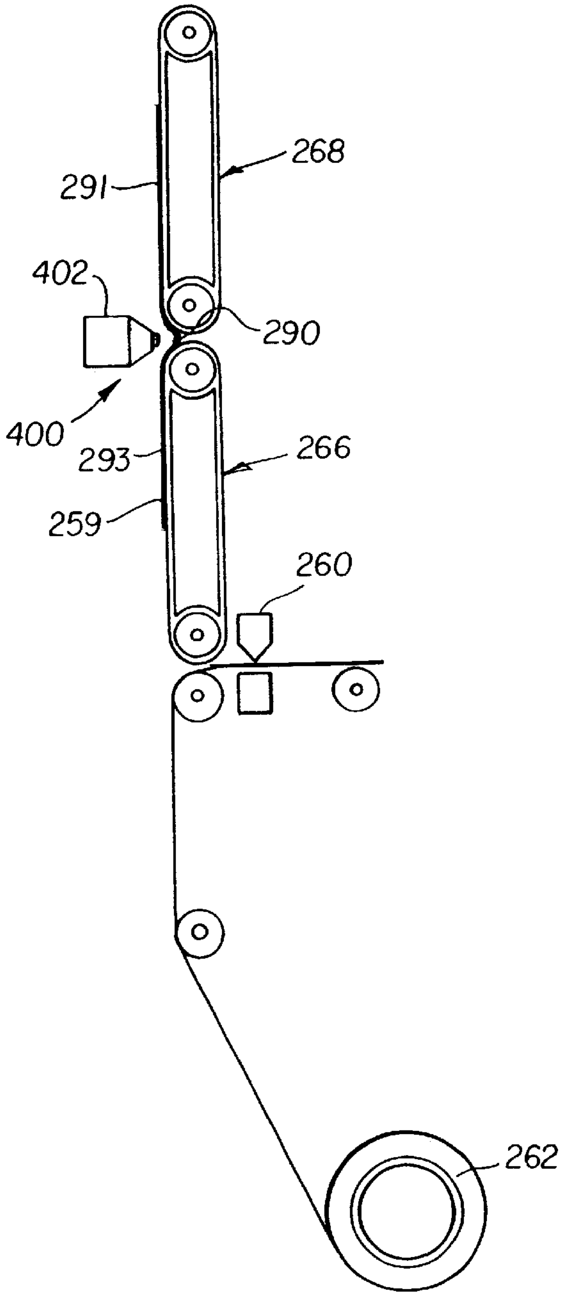

In the embodiment of FIG. 7, the locating and fold-initiating assembly 280 uses an engaging surface for locating and initiating the fold. However, the present invention is not so limited. Referring to FIGS. 10*a* and 10*b* there is illustrated a modified folding assembly 400 similar to assembly 280 like parts indicating like parts and operation. In this embodiment, an air knife 402 is used for initiating the fold. Thus after the segment 259 is positioned for folding, like in FIG. 9*a*, the air knife 402 is energized such that a stream of air is expelled from the knife 402 so as to cause the segment 259 to move to the position illustrated in FIG. 10*b*. Thereafter the segment 259 is folded in the same manner discussed with respect to the embodiment of FIG. 7.

Figure 11:
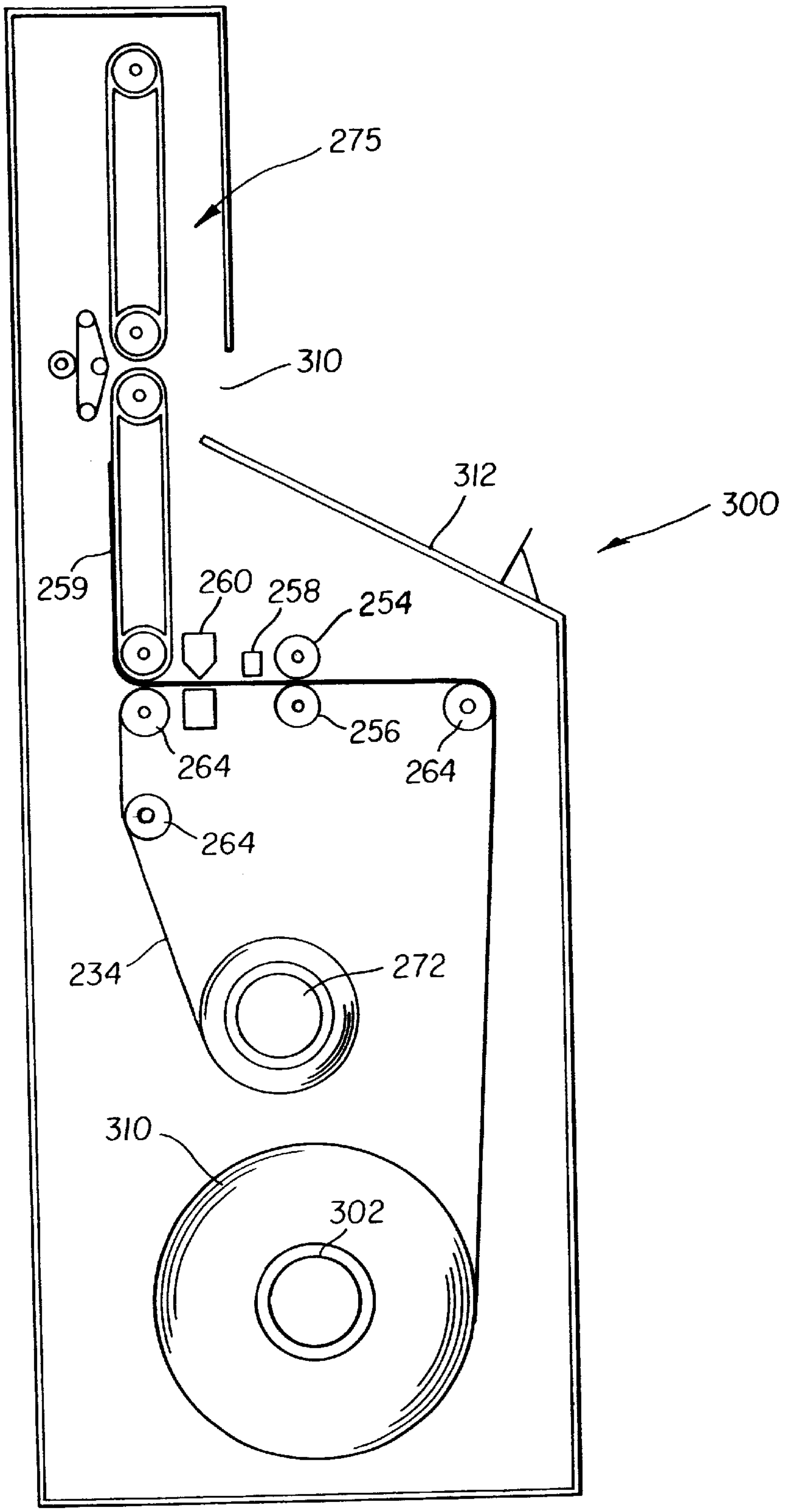
FIG. 11 is stand alone folding apparatus for making an album in accordance with the present invention.
Figure 12:
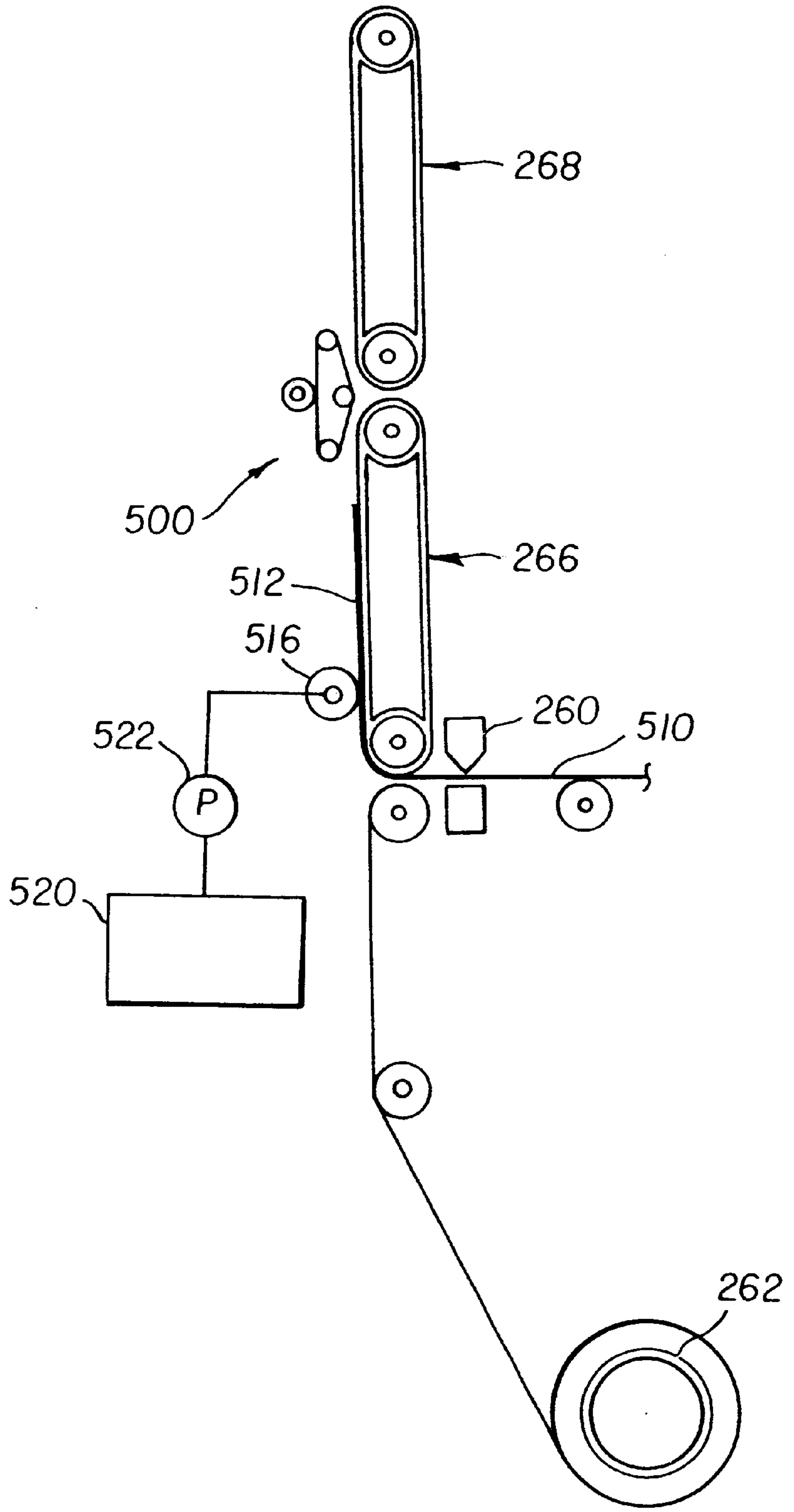
FIG. 12 is a view similar to that illustrated of FIGS. 9*a*–9*h* illustrating yet another modified folding apparatus made in accordance with the present invention.

In FIG. 7, the folding mechanism 265 is shown as being a part of a larger photofinishing apparatus. However, the present invention is not so limited. If desired, the folding mechanism 265 may be a stand-alone apparatus 300 as illustrated by FIG. 12. Apparatus 300 is similar to apparatus 200, like numerals indicating like parts and operation. In the embodiment of FIG. 11, the photosensitive paper 224 on which images have been printed is provided in a roll 310 wound on a core 302. The core 302 is rotatably mounted to apparatus 300. Thus instead of being dedicated to a single printing and processing apparatus, the apparatus 300 may receive photographic paper from a plurality of different devices. The finished leaf is dispensed out opening 310 on to receiving tray 312.

In the embodiment illustrated in FIGS. 7–16 a photographic paper 224 is provided with an adhesive layer 232 having a release layer 234 covering the adhesive layer 232. The folding apparatus 275 may be made to accommodate normal photographic paper without any previously applied adhesive layer 232 or release layer 234. Referring to FIG. 12 there is illustrated a modified folding apparatus 500 made in accordance with the present invention. In particular, apparatus 500 is similar to the folding apparatus 200 of FIG. 7, like numerals indicating like parts and operation. In this embodiment normal photographic paper 510 is provided which does not have any previously applied adhesive to the back side 512. After segment 259 is cut, an adhesive is applied to the back side 512 of the photographic paper 510. Adhesive may be applied to the back side 512 in any desired manner. In the embodiment illustrated an adhesive layer is applied by use of an applicator metering roller 516. Adhesive from a reservoir 520 is supplied by pump 522 and applied in a controlled metered fashion on the back side 512. The roller 516 is located such that once the segment 259 is positioned on belt assemblies 266, 268 the back sides 512 will have been sufficiently covered so that after folding of segment 259, the formed leaf 10 will be firm integral structure. It is to be understood that any appropriate adhesive may be used and applied by any desired manner, for example, but not by way of limitation, by spraying of the adhesive on back side 512.

It is also to be understood that the web 92 may be developed and/or dried by any conventional manner as is currently done or may arise in the future with photosensitive media. For example, by the passing of the media through a plurality of processing solutions for developing, fixing and rinsing of the image, and thereafter the images are sent to a dryer and then sorted into the individual prints.

Figure 13A:
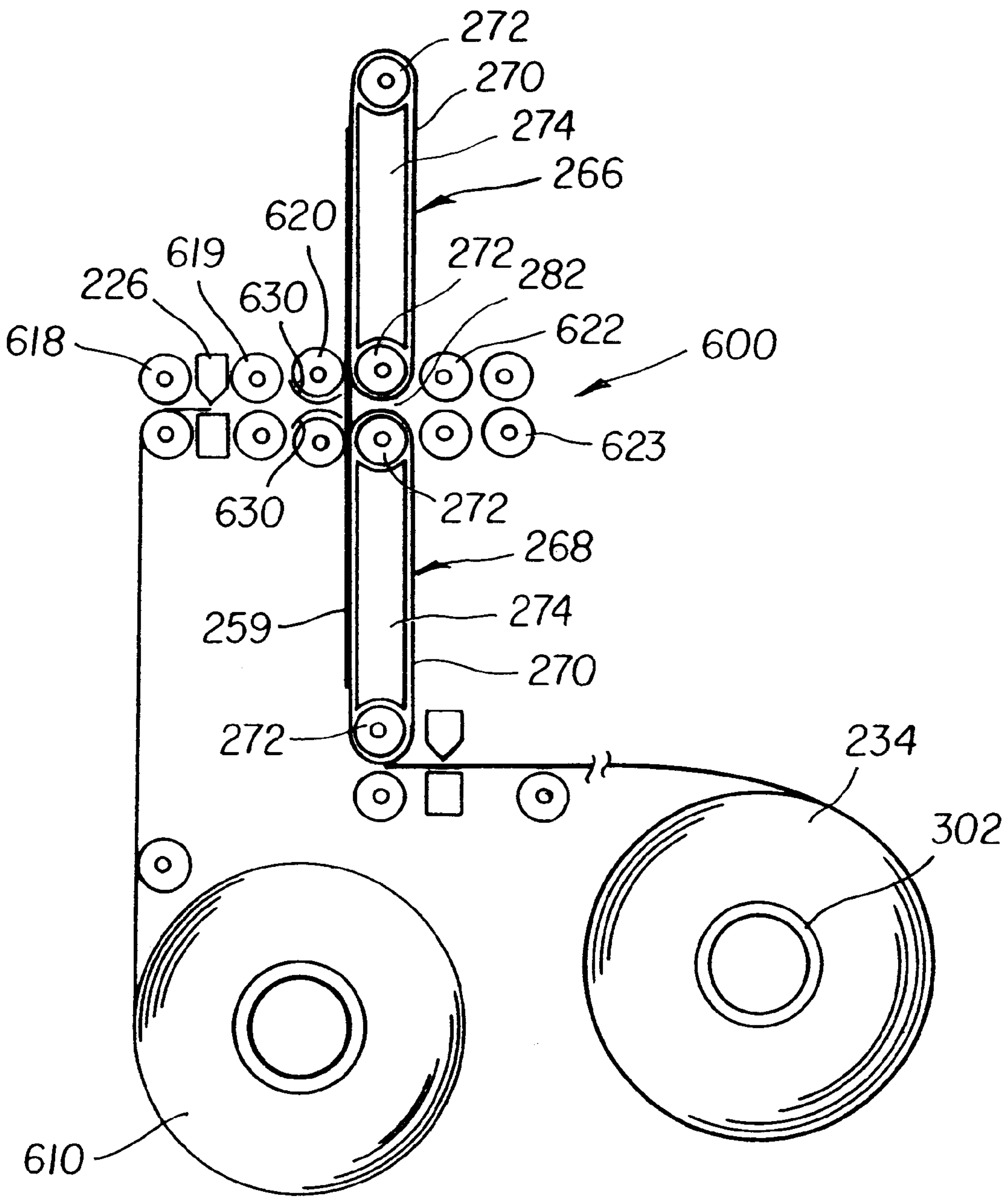
FIGS. 13*a*–13*e* are views similar to FIGS. 9*a*–9*h* illustrating yet another modified folding mechanism made in accordance with the present invention.
Figure 13C:
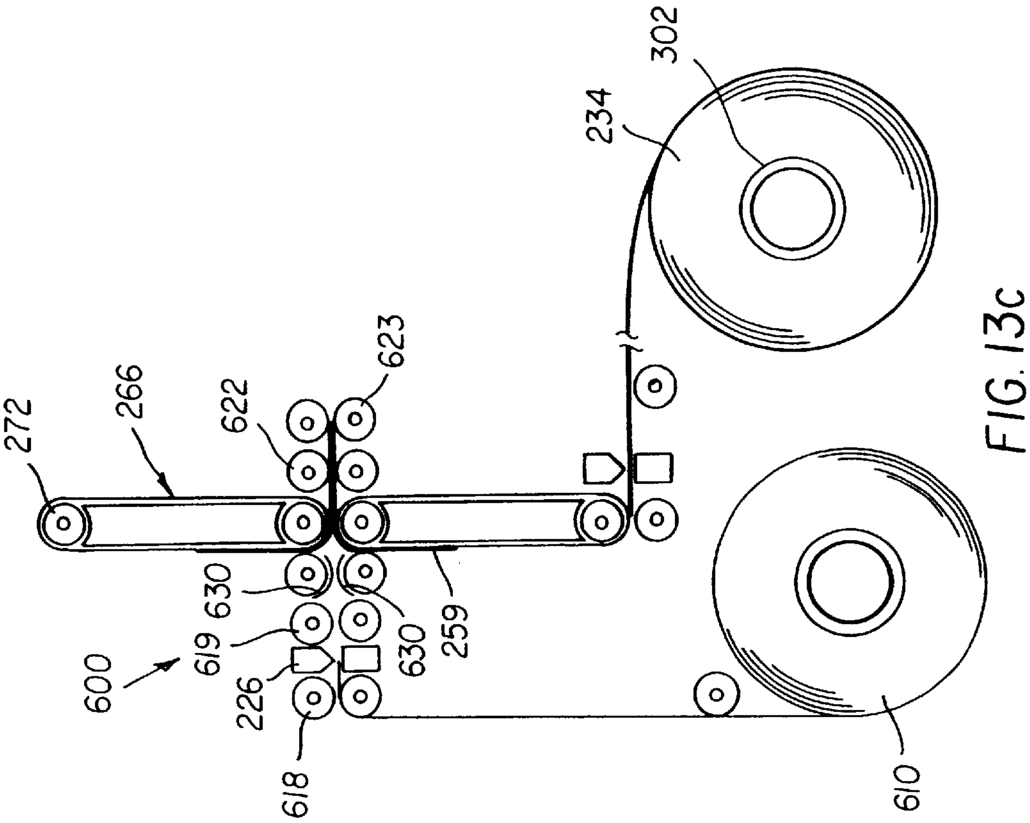
Figure 13B:
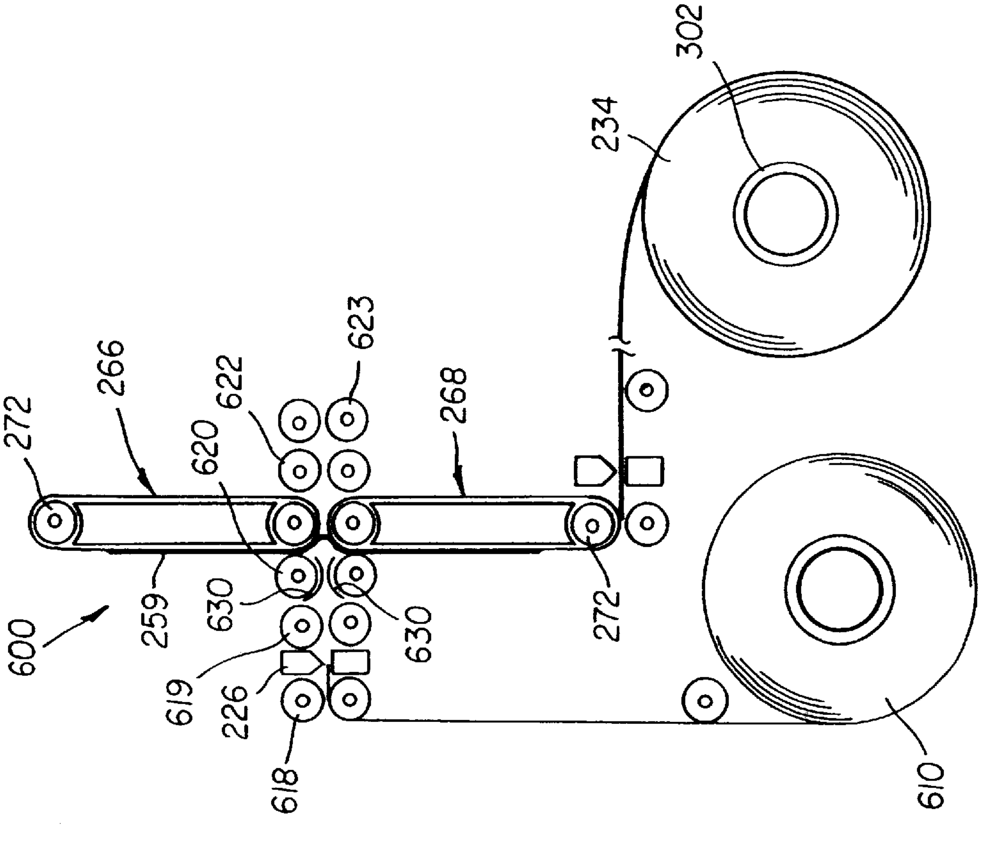
Figure 13E:
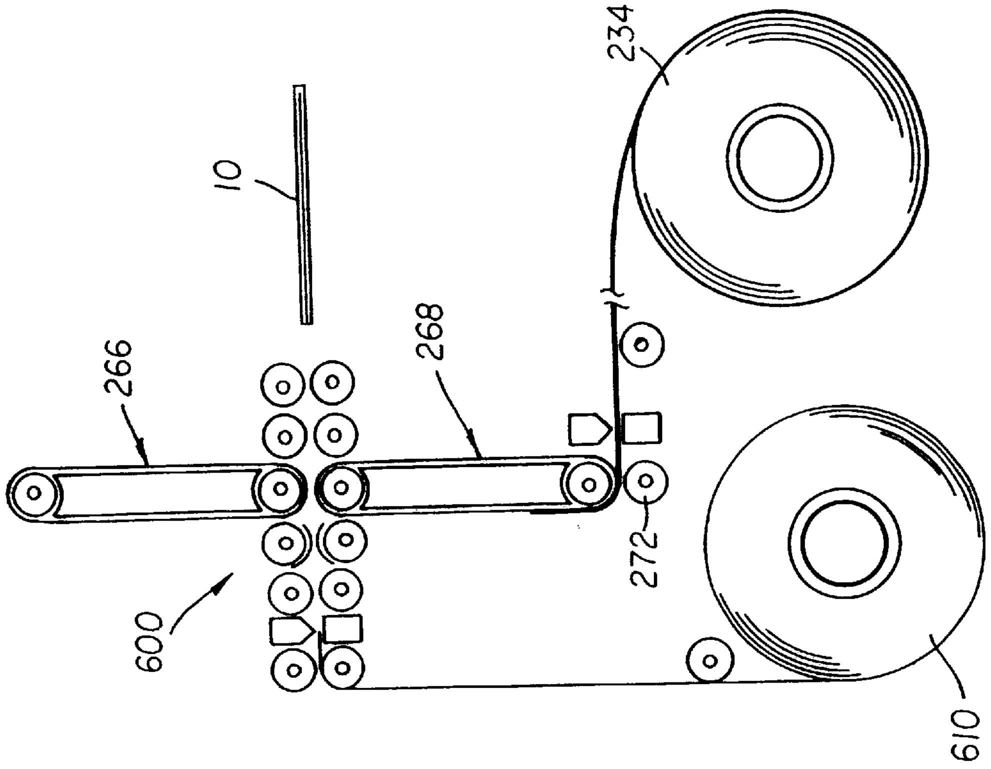
Figure 13D:
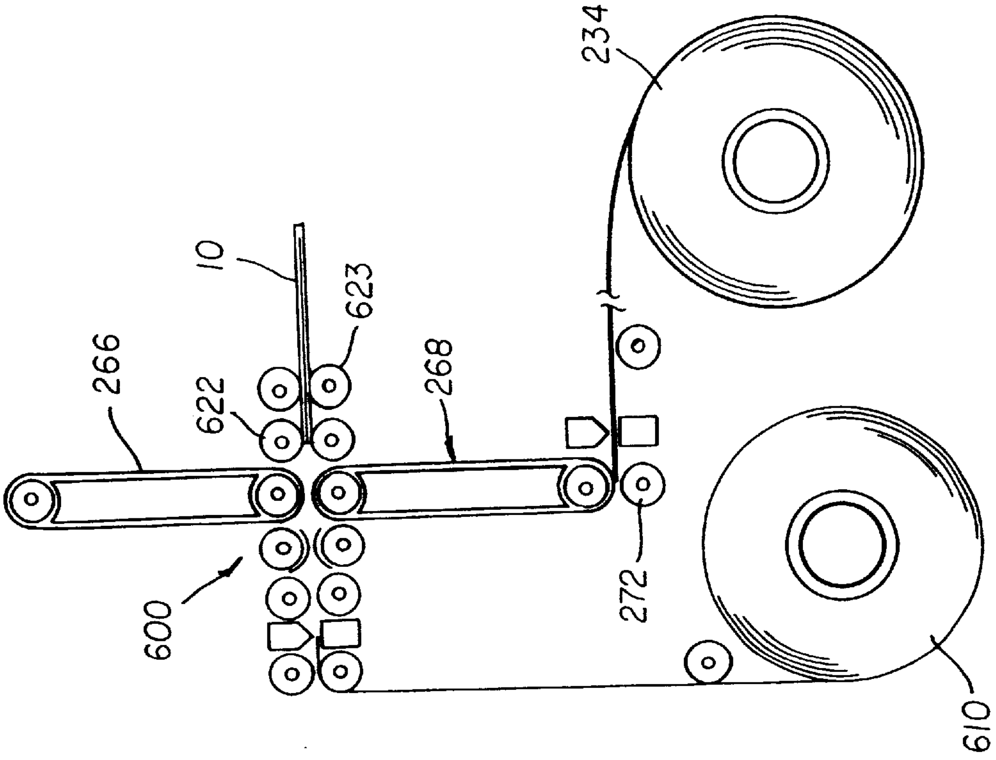

Referring to FIGS. 13*a*–13*e* there is illustrated in sequential steps the operation of yet another modified folding mechanism 600 made in accordance with the present invention. Folding mechanism 600 is similar to mechanism 265, like numerals indicating like parts and operation as previously discussed. In this embodiment folding mechanism 600 uses a web 610 designed such that when heated will cause a folded segment of media, such as photographic paper 612 to be permanently adhered. In particular web 610 is provided on a reel and/or core 614. The core 614 is such that when mounted to mechanism 600 the web 610 may be unwound from core 614. The web 610 is fed past a first guide roller 618 and then through a pair of guide rollers 618, 619 and 620 which are in alignment with opening 282 between the belt assemblies 266, 268. The web 610 may be fed in any desired manner. In the embodiment illustrated at least one of the roller pairs 618, 619, 620 are used to feed the web 610. Two additional pairs of guide rollers 622, 623 are disposed on the opposite side of the belt assemblies 266, 268 for guiding of the folded segment 259. A cutter 226 is positioned between rollers 618 and 619 for cutting of the web 610 at the appropriate length necessary for leaf 10. FIG. 13*a* illustrated the segment 259 after it has been positioned on the belt assemblies 266, 268. The web 610 is then fed until it contacts segment 259. Thereafter the belt assemblies 266, 268 are operated along with feeding of the web 610 to form the leaf 10 as illustrated by FIGS. 13*c*–13*e*. The pair of rollers 622, 623 are preferably pressure rollers used to press the lateral sides of segment 259 together. In the embodiment illustrated the pair of rollers 620 are each provided with a heating element 630 for heating of the web 610 for activating of the adhesive so the lateral sides of the segment will be permanently secured together. It is to be understood that any heating means may be used to activate the adhesives, for example, but not by way of limitation, heated air.

The invention has been described in detail with particular reference to certain preferred embodiments thereof, but it will be understood that variations and modifications can be effected within the spirit and scope of the invention.

PARTS LIST 10. album leaf
12. first side
14. second side
15. image
16. image
17. image
18. image
19. image
21. image
22. image
23. image
24. image
25. image
28. holes
29. marginal area
30. apparatus
31. side
32. web
33. side
34. reel core
35. metering roller
36. processing path
37. pinch rollers
38. guide rollers
39. pinch rollers
40. printing section
44. cutting mechanism
48. retaining section
50. printing mechanism
52. printing mechanism
53. cartridge
54. computer
55. cassette body
56. inkjet nozzle
57. printing path
58. inkjet nozzle
60. marking mechanism
62. sensor
80. modified apparatus
80a. apparatus
82. web
84. web
88. web
89. sides
91. section
92. web
94. guide rollers
98. apparatus
100. photosensitive side
101. non-photosensitive side
102. merged media
104. laser printer
106. laser printer
109. modular
110. printing section
112. writing light beam
113. development section
114. rotating polygon
116. developers -continued

| PARTS LIST |
| --- |
| 118. web |
| 120. supply reel |
| 122. take-up reel |
| 124. path |
| 128. application system |
| 130. pressure applicator mechanism |
| 132. dryer |
| 145. receiving tray |
| 200. apparatus |
| 210. printing section |
| 212. media |
| 214. film |
| 216. digital scanner |
| 218. image data manager |
| 220. printer |
| 224. photographic paper |
| 225. marking mechanism |
| 226. front side |
| 228. back side |
| 229. substrate |
| 230. photosensitive emulsion layer |
| 232. adhesive layer |
| 234. release layer |
| 240. processing tanks |
| 241. processing tanks |
| 242. processing tanks |
| 243. processing tanks |
| 244. processing tanks |
| 245. processing tanks |
| 246. processing tanks |
| 247. drying section |
| 250. finishing section |
| 252. processing path |
| 254. guide rollers |
| 256. drive roller |
| 258. sensor |
| 259. segment |
| 260. cutter |
| 262. take-up core |
| 265. folding mechanism |
| 266. drive assembly |
| 267. opening |
| 268. assembly |
| 269. opening |
| 270. drive belt |
| 272. rollers |
| 274. support plenum |
| 276. top surface |
| 279. arrow |
| 280. assembly |
| 281. point |
| 282. rollers |
| 283. cam |
| 287. arrows |
| 288. engagement section |
| 289. arrows |
| 290. section |
| 291. sides |
| 292. shelf |
| 293. sides |
| 300. apparatus |
| 310. roll |

-continued

| PARTS LIST |
| --- |
| 312. receiving tray |
| 400. assembly |
| 402. air knife |
| 500. apparatus |
| 510. paper |
| 512. back side |
| 516. metering roller |
| 522. pump |
| 600. folding mechanism |
| 610. web |
| 614. core |
| 618. guide rollers |
| 619. guide rollers |
| 620. guide rollers |
| 622. guide rollers |
| 623. guide rollers |
| 624. guide rollers |
| 630. heating element |

What is claimed is:

1. A replaceable printing cartridge for use in a printer having a defined processing path along which a media travels in said printer, said replaceable printing cartridge being positioned on said printer for printing on said media and is capable of being removed without disturbing said processing path, comprising;

a cassette body;

a first print mechanism for printing on a first printing side of said media; and a second print mechanism for printing of a second print side of said media.

2. A replaceable printing cartridge according to claim 1 wherein said second print mechanism being positioned directly opposite said first print mechanism.

3. A replaceable printing cartridge according to claim 1 wherein said first and second print mechanism is an inkjet printer.

4. A single replaceable printing cartridge for use in a printer having a defined processing path along which a media travels, said replaceable printing cartridge being positioned on said printer for printing on said media and is capable of being removed without disturbing said processing path, comprising;

a cassette body;

a first print mechanism for printing on a first printing side of said media; and a second print mechanism for printing of a second print side of said media.

* * * * *